United States Patent
Deck

(10) Patent No.: US 12,305,980 B2
(45) Date of Patent: May 20, 2025

(54) OPTICAL CONTACT METROLOGY

(71) Applicant: Zygo Corporation, Middlefield, CT (US)

(72) Inventor: Leslie L. Deck, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 196 days.

(21) Appl. No.: 17/947,624

(22) Filed: Sep. 19, 2022

(65) Prior Publication Data

US 2023/0092947 A1 Mar. 23, 2023

Related U.S. Application Data

(60) Provisional application No. 63/246,074, filed on Sep. 20, 2021.

(51) Int. Cl.
*G01B 9/02* (2022.01)
*G01B 11/14* (2006.01)

(52) U.S. Cl.
CPC .......... *G01B 9/02041* (2013.01); *G01B 11/14* (2013.01)

(58) Field of Classification Search
CPC .............. G01B 9/02041; G01B 11/14; G01B 2290/70; G01B 9/02057; G01B 11/06; G01B 11/0675; G01B 11/2441; G01B 2290/45; G01N 21/211; G01N 21/8422
See application file for complete search history.

(56) References Cited

U.S. PATENT DOCUMENTS

| | | | |
|---|---|---|---|
| 5,739,906 A | * | 4/1998 | Evans .................... G01B 11/06 356/503 |
| 6,284,085 B1 | | 9/2001 | Gwo |
| 6,882,432 B2 | | 4/2005 | Deck |

(Continued)

FOREIGN PATENT DOCUMENTS

| | | | | |
|---|---|---|---|---|
| CN | 86104318 A | * | 12/1987 | .......... G01M 11/061 |
| KR | 20040074069 A | * | 8/2004 | ............... G01B 9/02 |

OTHER PUBLICATIONS

Born, M., et al., "Principles of optics: Electromagnetic theory of propagation, interference and diffraction of Light", (6th ed.), Oxford; New York: Pergamon Press. ISBN 0-08-026482-4. OCLC 7106160, pp. 51-66 (1980).

(Continued)

*Primary Examiner* — Mohamed K Amara
(74) *Attorney, Agent, or Firm* — Fish & Richardson P.C.

(57) ABSTRACT

A method for measuring a bond gap includes receiving a light beam at a first interferometer cavity and a reference interferometer cavity, in which the first interferometer cavity is defined by a first surface and a contact interface, and the contact interface is defined by a contact gap less than 1 μm. The method includes determining a first interference amplitude of the first interferometer cavity and a second interference amplitude of the reference interferometer cavity by applying wavelength tuning and spectral analysis to measured intensities of light from the first interferometer cavity and the reference interferometer cavity. The contact gap is determined based on a ratio of the first interference amplitude and the second interference amplitude and information about a mapping between various interference amplitude ratios and expected contact gap values.

45 Claims, 15 Drawing Sheets

(56) References Cited

U.S. PATENT DOCUMENTS

| | | | |
|---|---|---|---|
| 7,139,081 B2 | 11/2006 | de Groot | |
| 7,488,930 B2* | 2/2009 | Ajgaonkar | G01B 9/0209 356/477 |
| 8,210,690 B2* | 7/2012 | Gulvin | G09G 3/001 356/519 |
| 9,025,160 B2* | 5/2015 | Moore | G01B 9/02004 356/498 |
| 10,610,096 B2* | 4/2020 | Scheibler | A61B 3/102 |
| 11,497,396 B2* | 11/2022 | Kubota | A61B 3/103 |
| 11,730,363 B2* | 8/2023 | Kubota | G01B 9/0207 351/221 |
| 11,867,629 B2* | 1/2024 | Cavazos Sepulveda | G01N 21/552 |
| 12,218,485 B2* | 2/2025 | Kischkat | H01S 5/0654 |
| 2003/0132386 A1* | 7/2003 | Carr | G01J 3/26 250/338.1 |
| 2006/0082863 A1* | 4/2006 | Piehl | G09G 3/3466 359/291 |
| 2008/0043244 A1* | 2/2008 | Hatori | G01B 9/02004 356/477 |
| 2008/0080026 A1* | 4/2008 | Mestha | G01J 3/26 358/504 |
| 2008/0080027 A1* | 4/2008 | Mestha | G01J 3/50 358/504 |
| 2010/0245832 A1* | 9/2010 | Saari | G01J 3/2803 356/454 |
| 2011/0108720 A1* | 5/2011 | Ford | G01N 21/274 250/262 |
| 2013/0128338 A1* | 5/2013 | Lin | G01J 3/26 359/578 |
| 2015/0115146 A1* | 4/2015 | Jones | G01N 21/648 250/269.1 |
| 2023/0092947 A1* | 3/2023 | Deck | G01B 9/02041 356/614 |

OTHER PUBLICATIONS

Deck, L., "Fourier-Transform Phase Shifting Interferometry", Applied Optics, vol. 42, No. 13, pp. 2354-2365 (2003).

Deck, L., "Model-based phase shifting interferometry", Applied Optics, vol. 53, No. 21, pp. 4628-4636 (Jul. 20, 2014).

Kalkowski, G. et al., "Optical contacting of low-expansion materials", Proceedings of SPIE, vol. 8126, pp. 8126F-1-81261F-7 (2011).

* cited by examiner

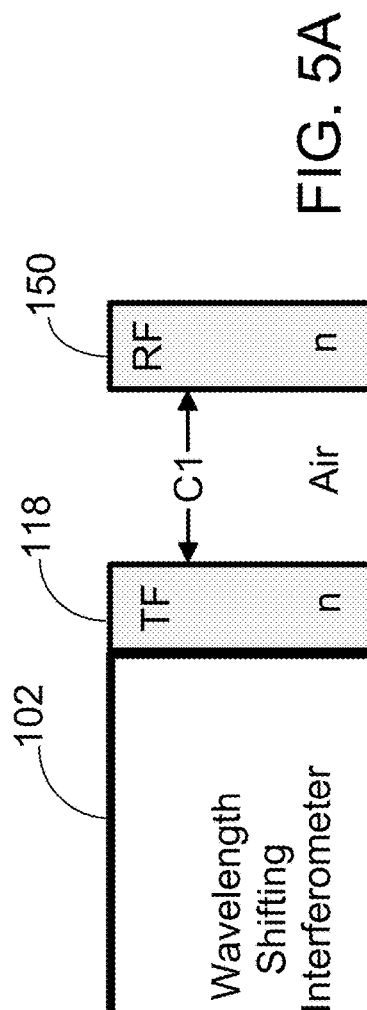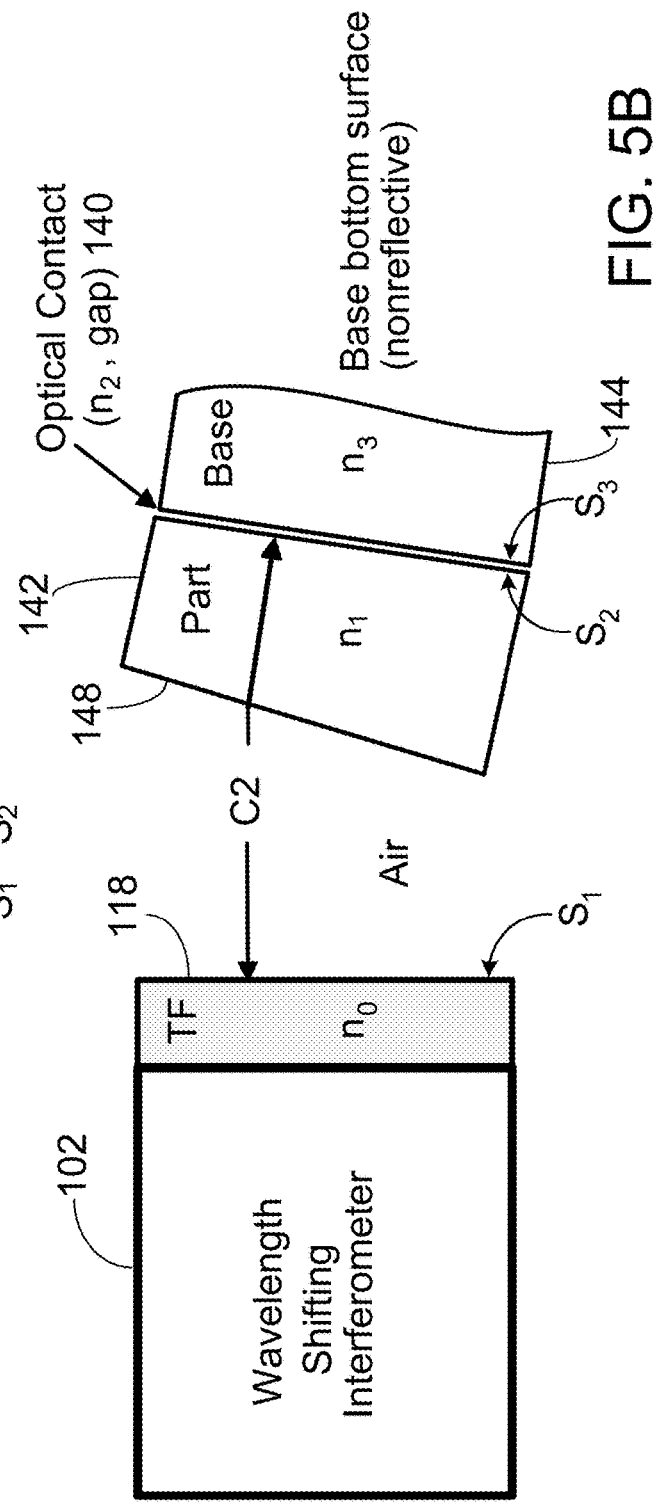
FIG. 5A
FIG. 5B

OPTICAL CONTACT METROLOGY

CROSS-REFERENCE TO RELATED APPLICATION

This application claims priority to U.S. provisional patent application 63/246,074, filed on Sep. 20, 2021, the entire content of which is incorporated by reference.

BACKGROUND

In some examples, optical contacting can be used to bond two conformal (e.g., flat) surfaces without adhesive using intermolecular forces (e.g., Van der Waals, hydrogen bonds and/or dipole-dipole interactions). These attractive forces engage when the two surfaces are in intimate contact, producing a bond gap that can be very small, e.g., a few nanometers. The optical bonding process results in interfaces that have small reflection or absorption. The bond quality is directly related to the gap between the bonded surfaces, which can be difficult to measure. For example, the free spectral range of commercially available tunable sources is too small to resolve the gap between the two surfaces that generate the bond using standard swept wavelength interferometry. In some examples, an interferometric method can be used to search for top surface topography deformations produced by particle contamination trapped in the bond. This method can determine the location of the contamination if the contacted part is thin enough and provides some information about the contaminant size, but it can be difficult to assess the bond quality itself.

SUMMARY

In a general aspect, a method for assessing the quality of an optically contacted bond is provided. The method entails comparing the interference amplitude of a pair of surfaces (which define an interference cavity) containing the bond to the interference amplitude of another known inline pair of surfaces (which define another interference cavity) and comparing the measured amplitude ratio to one numerically calculated from a theoretical model of the system. Since the interference amplitude is a sensitive function of the contact gap, the gap can be accurately estimated from the amplitude ratio.

In another general aspect, a method for measuring a bond gap or contact gap using an interferometric technique that applies wavelength tuning is provided. The method enables the assessment of the contact quality and precise identification of the positions of contaminants regardless of part thickness. The method can be used for evaluating optical contact bonding and can also be used to evaluate other bonding techniques if the bond gap is sufficiently thin and the refractive index of the gap is known or can be estimated.

In another general aspect, a bond gap or contact gap measurement system including a wavelength tuned interferometer is provided. The system is configured to measure the optical separation between two bonded transparent surfaces in close contact, e.g., generally less than ¼ of the mean wavelength of the light used in the interferometer and often less than 10 nanometers. The interferometer observes and records interference from light reflected from pairs of surfaces (each pair of surfaces defining an interferometer cavity) illuminated with an optical wavefront while the wavelength is tuned through a predetermined range. At least two pairs of surfaces (that define two cavities) are illuminated, in which the two pairs of surfaces include a reference pair of surfaces (that define a reference optical cavity) with known characteristics and a test pair of surfaces (that define a test cavity) generated from a surface with known characteristics and the bonded interface (which has unknown characteristics). The surfaces with known characteristics can be generated with user supplied reference surfaces or surfaces inherent in the bonded assembly. A measurement of the contact gap or bond gap includes acquiring wavelength shifted interferograms from the pairs of surfaces (that define the cavities), spectrally decomposing the interference information at each image point to identify the spectral peaks corresponding to the pairs of surfaces (that define the cavities), calculating the value of an aspect of the pair of surfaces (that define a cavity) from the spectral peaks that depends on the bond gap, constructing a metric that describes the difference of the measured aspect values between the test and reference pairs of surfaces (that define the cavities) at the same image point and comparing the measured metric with a theoretical metric constructed from a mathematical model of the measurement to determine the bond gap.

Implementations can include one or more of the following features. In some examples, both test and reference pairs of surfaces (that define the cavities) are inline, and interference is acquired simultaneously from both pairs of surfaces (that define the cavities) during a measurement.

In some examples, measurements of both test and reference pairs of surfaces (that define the cavities) are obtained separately along with illumination intensity changes between the separate measurements.

In some examples, measurements of more than one aspect are made for both test and reference pairs of surfaces (that define the cavities).

In some examples, at least one measured aspect is the amplitude of the spectral peak.

In some examples, the measured metric is the ratio of the interference amplitude of the spectral peak from the test and reference pairs of surfaces (that define the cavities).

In another general aspect, a method includes receiving a light beam at a first interferometer cavity and a reference interferometer cavity, in which the first interferometer cavity is defined by a first surface and a contact interface, the contact interface is defined by a contact gap less than 1 μm; determining a first interference amplitude of the first interferometer cavity and a second interference amplitude of the reference interferometer cavity by applying wavelength tuning and spectral analysis to measured intensities of light from the first interferometer cavity and the reference interferometer cavity. The method includes determining the contact gap based on a ratio of the first interference amplitude and the second interference amplitude and information about a mapping between various interference amplitude ratios and expected contact gap values.

Implementations can include one or more of the following features.

The spectral analysis can include Fourier-transform phase shifting interferometry analysis of interference intensity measured over a period of time.

The contact gap can be less than 100 nm.
The contact gap can be less than 10 nm.
Measuring the first interference amplitude of the first interferometer cavity and the second interference amplitude of the reference interferometer cavity can include: measuring an intensity of light from the first interferometer cavity and the reference interferometer cavity; sampling the light intensity measurements, and analyzing the samples of the light intensity measurements to determine the first interference amplitude of the first interferometer cavity and the second interference amplitude of the reference interferometer cavity.

The method can include: generating the light beam using a swept wavelength tunable laser; sweeping the wavelength of the light beam from a first wavelength to a second wavelength; and sampling the light intensity measurements synchronously with the sweeping operation of the swept wavelength tunable laser.

Measuring the intensity of light reflected from the first interferometer cavity and the reference interferometer cavity can include using a camera having a plurality of pixels to measure the intensity of light reflected from the first interferometer cavity and the reference interferometer cavity; analyzing the samples of the light intensity measurements includes analyzing the samples of the light intensity measurements for each pixel to determine the first interference amplitude of the first interferometer cavity and the second interference amplitude of the reference interferometer cavity for each pixel; and determining the contact gap includes determining the contact gap for each location of the contact interface that corresponds to each of the pixels.

Information on the mapping between various interference amplitude ratios and expected contact gap values can include information on a mapping between various interference amplitude ratios and expected contact gap values that are determined based on an interference model of the first interferometer cavity and the reference interferometer cavity.

The reference interferometer cavity can be defined by a surface of a transmission flat of a source of the light beam and a first surface of an optical element, the first interferometer cavity can be defined by a second surface of the optical element and a surface of a base nearest the second surface of the optical element, and the contact gap can correspond to a distance between the second surface of the optical element and the surface of the base.

The second surface of the optical element can be bonded to the surface of the base by optical contact without using a glue between the second surface of the optical element and the surface of the base.

The first interference amplitude can be affected by at least one of (i) one or more additional surfaces, or (ii) one or more additional cavities.

In another general aspect, a method includes: generating a light beam using a swept wavelength tunable laser; directing the light beam toward a first interferometer cavity and a reference interferometer cavity, in which the first interferometer cavity is defined by a first surface and a contact interface, the contact interface has a reflectivity that is dependent on a contact gap less than 1 µm; sweeping the wavelength of the light beam from a first wavelength to a second wavelength; measuring an intensity of light reflected from the first interferometer cavity and the reference interferometer cavity, and sampling the light intensity measurements synchronously with the sweeping operation of the swept wavelength tunable laser; performing spectral analysis of the sampled light intensity measurements to generate an optical thickness spectrum; identifying a first peak and a second peak in the optical thickness spectrum; and determining the contact gap based on a ratio of an amplitude of the first peak and an amplitude of the second peak.

Implementations can include one or more of the following features. The spectral analysis can include Fourier-transform phase shifting interferometry analysis of interference intensity measured over a period of time.

The amplitude of the first peak can be dependent on a reflectivity of the contact interface, and the amplitude of the second peak can be dependent on characteristics of the reference interferometer cavity.

Measuring the intensity of light reflected from the first interferometer cavity and the reference interferometer cavity can include using a camera having a plurality of pixels to measure the intensity of light reflected from the first interferometer cavity and the reference interferometer cavity; performing Fourier-transform phase shifting interferometry analysis of the sampled light intensity measurements can include performing Fourier-transform phase shifting interferometry analysis of the sampled light intensity measurements for each pixel to generate an optical thickness spectrum for each pixel; and determining the contact gap can include determining the contact gap for each location of the contact interface that corresponds to each of the pixels.

Determining the contact gap can include: determining the ratio of the amplitude of the first peak and the amplitude of the second peak; and determining the contact gap based on information about a mapping between various amplitude ratios of first and second peaks and expected contact gap values determined based on an interference model of the first interferometer cavity and the reference interferometer cavity.

The reference interferometer cavity can be defined by a surface of a transmission flat of a source of the light beam and a first surface of an optical element, the first interferometer cavity can be defined by a second surface of the optical element and a surface of a base, and the contact gap can correspond to a distance between the second surface of the optical element and the surface of the base.

The second surface of the optical element can be bonded to the surface of the base by optical contact without using a glue between the second surface of the optical element and the surface of the base.

The reference interferometer cavity can be defined by a first surface of a parallel plate with known optical and physical characteristics and a second surface of the parallel plate, the first interferometer cavity can be defined by the second surface of the parallel plate and a first surface of an optical element, and the contact gap can correspond to a distance between a second surface of the optical element and a surface of a base. At least a portion of the light beam can pass the first and second surfaces of the parallel plate, pass the first surface of the optical element, and be reflected by an interface defined by the contact gap.

The second surface of the optical element can be bonded to the surface of the base by optical contact without using a glue between the second surface of the optical element and the surface of the base.

The intensity of light can be affected by at least one of (i) one or more additional surfaces, or (ii) one or more additional cavities.

In another general aspect, an apparatus includes: a light source configured to generate a light beam that is configured to be directed to a first interferometer cavity and a reference interferometer cavity, in which the first interferometer cavity is defined by a first surface and a contact interface, the contact interface is defined by a contact gap less than 1 µm; and a processor. The processor is configured to: determine a first interference amplitude of the first interferometer cavity and a second interference amplitude of the reference interferometer cavity by applying wavelength tuning and spectral analysis to measured intensities of light from the first interferometer cavity and the reference interferometer cavity; and determine the contact gap based on a ratio of the first interference amplitude and the second interference amplitude and information about a mapping between various interference amplitude ratios and expected contact gap values.

Implementations can include one or more of the following features.

The apparatus can include: a storage configured to store the information about the mapping between various interference amplitude ratios and expected contact gap values; a detector module configured to measure intensities of light from the first interferometer cavity and the reference interferometer cavity; and an acquisition module configured to sample the light intensity measurements provided by the detector module, in which the samples of the light intensity measurements are analyzed by the processor to determine the contact gap.

The detector module can include a camera having a plurality of pixels. The processor can be configured to: analyze the samples of the light intensity measurements for each pixel to determine the first interference amplitude of the first interferometer cavity and the second interference amplitude of the reference interferometer cavity for each pixel; and determine the contact gap for each location of the contact interface that corresponds to each of the pixels.

The light source can include a swept wavelength tunable laser.

The spectral analysis can include Fourier-transform phase shifting interferometry analysis of interference intensity measured over a period of time.

The contact gap can be less than 100 nm.

The contact gap can be less than 10 nm.

In another general aspect, an apparatus include: a contact gap measurement device including: a swept wavelength tunable laser that is configured to generate a light beam and sweep a wavelength of the light beam from a first wavelength to a second wavelength, in which the light beam is directed to a first interferometer cavity and a reference interferometer cavity, the first interferometer cavity is defined by a first surface and a contact interface, the contact interface is defined by a contact gap less than 1 µm. The contact gap measurement device includes a detector module configured to measure intensities of light from the first interferometer cavity and the reference interferometer cavity; an acquisition module configured to sample the light intensity measurements provided by the detector module; and a processor. The processor is configured to: perform spectral analysis of the sampled light intensity measurements provided by the acquisition module to generate an optical thickness spectrum; identify a first peak and a second peak in the optical thickness spectrum; and determine the contact gap based on a ratio of an amplitude of the first peak and an amplitude of the second peak.

Implementations can include one or more of the following features.

The detector module can include a camera having a plurality of pixels. The processor can be configured to: for each pixel, perform spectral analysis of the sampled light intensity measurements provided by the camera to generate an optical thickness spectrum; for each pixel, identify a first peak and a second peak in the optical thickness spectrum; and determine the contact gap for each location of the contact interface that corresponds to each of the pixels based on a ratio of an amplitude of the first peak and an amplitude of the second peak associated with the pixel.

The spectral analysis can include Fourier-transform phase shifting interferometry analysis of interference intensity measured over a period of time.

The contact gap can be less than 100 nm.

The contact gap can be less than 10 nm.

In another general aspect, a method includes: directing light towards a fourth surface and a third surface that is bonded to the fourth surface; determining a value of a first parameter based on measurements of the light, in which the first parameter is configured to depend on a value of a bond gap between the third and fourth surfaces; and determining the value of the bond gap based on the value of the first parameter and information about a mapping between various values of the first parameter and expected bond gap values.

Implementations can include one or more of the following features.

The first parameter can represent a normalized amplitude of a spectral peak in a spectrogram generated by applying wavelength tuning and spectral analysis to measurements of the light reflected from the third surface, the fourth surface, and additional surfaces.

The additional surfaces can include a first surface and a second surface. The fourth surface can include a front surface of a base, and the third surface can include a rear surface of an optical part that is bonded to the base. The second surface can include a front surface of the optical part, in which the front surface is upstream to the rear surface in an optical path of the light. The first surface can includes a reference surface. The second and third surfaces can define a test interferometer cavity, and the first and second surfaces can define a reference interferometer cavity.

The method can include: measuring a first interference intensity that includes information about an interference between portions of the light reflected from the second and third surfaces and an interference between portions of the light reflected from the first and second surfaces to generate a first set of measurements, and generating the spectrogram by applying the spectral analysis to the first set of measurements.

The method can include: measuring a first interference intensity that includes information about an interference between portions of the light reflected from the second and third surfaces and an interference between portions of the light reflected from the first and second surfaces to generate a first set of measurements, and measuring a second interference intensity that includes information about an interference between portions of the light reflected from the second and third surfaces to generate a second set of measurements, in which the second interference intensity is not affected by an interference associated with the reference interferometer cavity. The method can include generating the spectrogram by applying the spectral analysis to the first set of measurements and the second set of measurements.

The method can include tilting the first surface relative to an optical axis such that the light reflected from the first surface is not measured when generating the second set of measurements.

The method can include: directing light having a lower intensity towards the first, second, third, and fourth surfaces when measuring the first interference intensity, directing light having a higher intensity towards the first, second, third, and fourth surfaces when measuring the second interference intensity, and generating the spectrogram by applying the spectral analysis to the first set of measurements and the second set of measurements. The first set of measurements and the second set of measurements can be scaled differently taking into account of a difference between the lower intensity and higher intensity of the light when making the first and second sets of measurements.

The additional surfaces can include a first surface and a second surface. The fourth surface can include a front surface of a base, and the third surface can include a rear surface of an optical part that is bonded to the base. The optical part can include a wedge such that a front surface of the optical part is not parallel to the rear surface of the optical part, and the front surface is upstream to the rear surface in an optical path of the light. The second surface can include a rear surface of a parallel plate, and the first surface can include a front surface of the parallel plate. The second and third surfaces can define a test interferometer cavity, and the first and second surfaces can define a reference interferometer cavity.

The method can include: measuring a first interference intensity that includes information about an interference between portions of the light reflected from the second and third surfaces and an interference between portions of the light reflected from the first and second surfaces to generate a first set of measurements, and generating the spectrogram by applying the spectral analysis to the first set of measurements.

The additional surfaces can include a first surface and a second surface. The fourth surface can include a front surface of a base, and the third surface can include a rear surface of an optical part that is bonded to the base. The optical part can include a wedge such that the front surface of the optical part is not parallel to the rear surface of the optical part, and the front surface is upstream to the rear surface in an optical path of the light. The second surface can include a front surface of a parallel plate, and the first surface can include a reference surface. The first and third surfaces can define a test interferometer cavity, and the first and second surfaces can define a reference interferometer cavity.

The method can include: measuring a first interference intensity that includes information about an interference between portions of the light reflected from the first and second surfaces to generate a first set of measurements; and measuring a second interference intensity that includes information about an interference between portions of the light reflected from the first and third surfaces to generate a second set of measurements. At least one of (i) the second interference intensity is not affected by an interference between portions of the light reflected from the first and second surfaces, or (ii) the parallel plate including the fourth surface is removed when measuring the second interference intensity. The method can include generating the spectrogram by applying the spectral analysis to the first set of measurements and the second set of measurements.

The method can include: directing light having a lower intensity towards the first and second surfaces when measuring the first interference intensity, directing light having a higher intensity towards the first, third, and fourth surfaces when measuring the second interference intensity, and generating the spectrogram by applying the spectral analysis to the first set of measurements and the second set of measurements. The first set of measurements and the second set of measurements can be scaled differently taking into account of a difference between the lower intensity and higher intensity of the light when making the first and second sets of measurements.

The various aspects can be implemented as methods, apparatuses, systems, computer-readable media, means for performing the methods, or a combination of the above.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

Other features, objects, and advantages of the invention will be apparent from the following detailed description.

BRIEF DESCRIPTION OF DRAWINGS

FIGS. 5A and 5B are diagrams of examples of measurement geometries for a process that uses two measurements to assess the quality of an optical contact between a wedge and a base.

Like reference symbols in the various drawings indicate like elements.

DETAILED DESCRIPTION

This document describes a contact gap measurement system and method for measuring a contact gap that is very small, e.g., a contact gap that is less than ¼ of the mean wavelength of the light used, i.e. less than 200 nm, less than 100 nm, less than 50 nm, or less than 10 nm. The system uses wavelength tuning interferometry to measure the optical gap indirectly through a measurement of the interference amplitude (IA) from a 2-surface cavity (test cavity) generated by replacing one of those surfaces with the contact interface. The free-spectral range of the test cavity is configured to be large enough to measure the interference amplitude. The test cavity interference amplitude is compared with the interference amplitude from another inline cavity (reference cavity) with known optical characteristics. Placing the reference cavity inline with the test cavity allows the comparison to be independent of spatial intensity variations. The bond gap is determined by comparing the interference amplitude measurements from the test and reference cavities against a mathematical model with contact gap as a free parameter. Using interference amplitude reduces or removes sensitivity to the optical path length of the test and reference cavities while maximizing the sensitivity to the contact gap.

The inventive system and method can assess the contact quality and precisely identify the positions of contaminants regardless of part thickness. The inventive system and method can also be used to determine the bond gaps that are produced by other bonding techniques if the bond gap is thin enough and the refractive index of the gap is known or can be estimated.

The contact gap measurement system has many technical improvements compared to past measurement systems. Conventional measurement systems that use wavelength tuning interferometry may be incapable of measuring a contact gap directly because the free spectral range (FSR) of a cavity generated by an optical contact is much larger than the tuning range of tunable lasers. For example, an optical bond with a gap of 2 nanometers generates a cavity with an FSR of ~150,000,000 GHz. Most commercial tunable lasers have tuning ranges more than a million times smaller. The contact gap measurement system according to the invention overcomes this problem by using a test cavity with a much larger FSR and using interference amplitude as a surrogate for the contact gap, guided by a mathematical model of interference amplitude as a function of contact gap.

Figure 1:
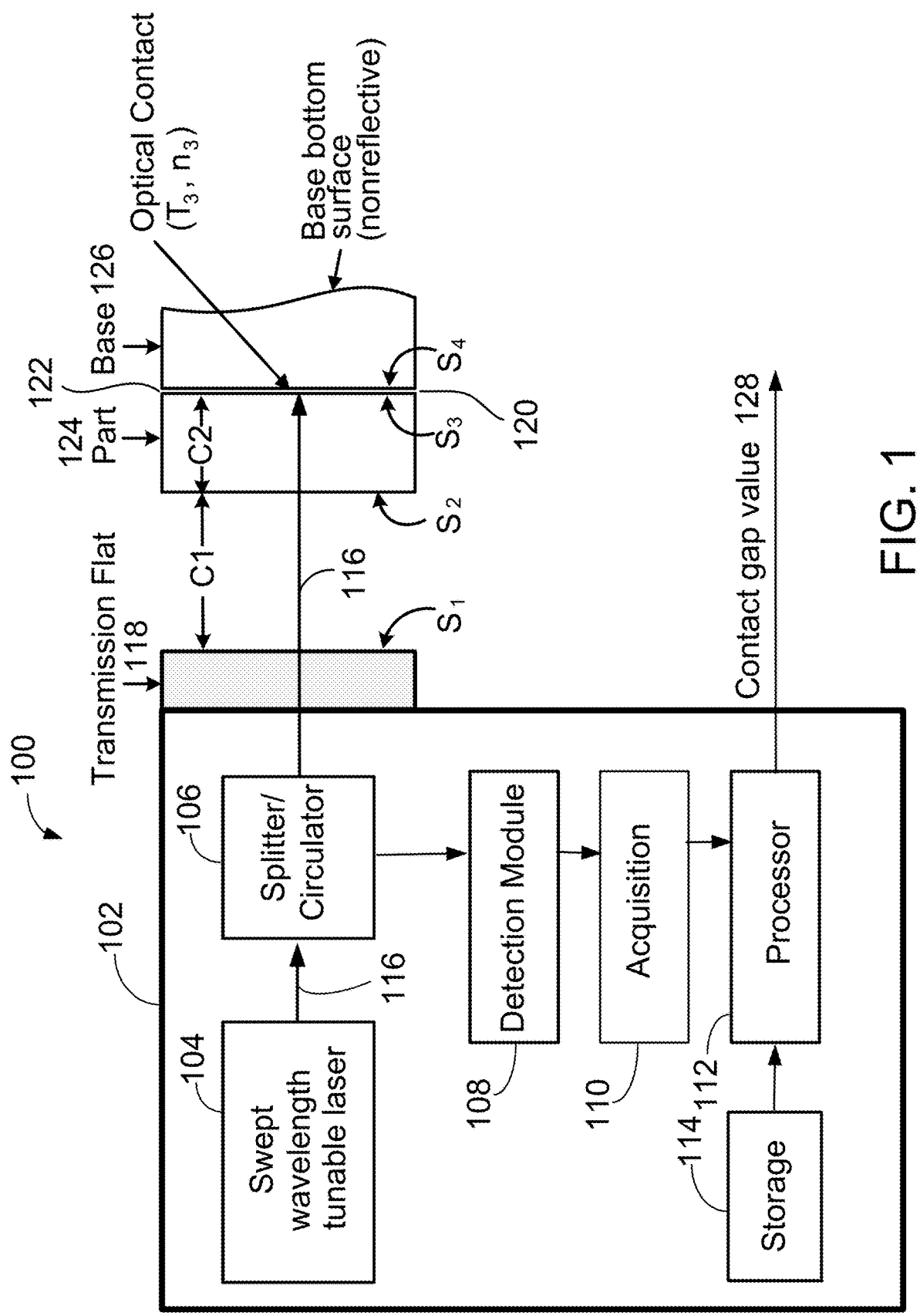
FIG. 1 is a block diagram of an example of a contact gap measurement system.

FIG. 1 is a diagram of an example of a contact gap measurement system 100 that is suitable for measuring a bond gap 120 of an optical contact between an optical part 124 and a base 126, in which the bond gap 120 can be, e.g., less than 1 μm, less than 100 nm, or less than 10 nm. The system 100 includes a wavelength shifting interferometer 102, which includes a swept wavelength tunable laser 104, an optical splitter or circulator 106, a detection module 108, an acquisition module 110, a processor 112, and a storage device 114. The interferometer 102 outputs a laser beam 116 through a surface $S_1$ of a transmission flat 118, which is made of a material that is substantially transparent to the laser beam 116, and with one reflecting surface ($S_1$) that is part of the C1 (reference) cavity.

In this example, the optical contact is formed by contacting a rear surface $S_3$ of an optical part 124 to a front surface $S_4$ of a base 126. The optical part 124 is assumed to be conformal (e.g., a parallel plate). In this example, the optical part 124 and the base 126 are made of the same material and have the same refractive index. However, the invention can also be applied to other examples in which the optical part 124 and the base 126 are made of different materials and have different refractive indices. A transmission flat 118 serves as an optical reference. The optical part 124 is positioned relative to the transmission flat 118 such that a front surface $S_2$ of the optical part 124 faces, and is spaced apart from, a surface $S_1$ of the transmission flat 118. The pair of surfaces $S_1$ and $S_2$ define a first interferometer cavity C1, and the pair of surfaces $S_2$ and $S_3$ define a second interferometer cavity C2. The surfaces $S_1$, $S_2$, $S_3$, and $S_4$ are substantially transparent, e.g., having a transmissivity greater than 90%, or greater than 95%, or greater than 99%, or greater than 99.9%. Because the surfaces $S_3$ and $S_4$ are very close to each other, the effective reflectivity of the surface $S_3$ is affected by the bond gap 120. The rear surface of the base 126 is nonreflective or angled in a direction such that reflection from the rear surface of the base 126 is not observed by the interferometer. In this document, the term "cavity" refers to a pair of substantially transparent (and partially reflective) surfaces, separated by an optical distance, with both surfaces normal to the illumination wavefront.

The swept wavelength tunable laser 104 generates a laser beam 116 that is directed toward the optical splitter 106. The optical splitter 106 outputs the laser beam 116 through the transmission flat 118, in which the laser beam 116 is directed toward the optical part 124. Each of the surfaces $S_1$, $S_2$, $S_3$, and $S_4$ can reflect a portion of the laser light 116 resulting in interference. The reflected light is directed back towards the splitter 106, which directs the reflected light to the detection module 108. The output signal of the detection module 108 is sampled by the acquisition module 110, and the output of the acquisition module 110 is processed by the processor 112 to determine the contact gap value 128.

Figure 2A:
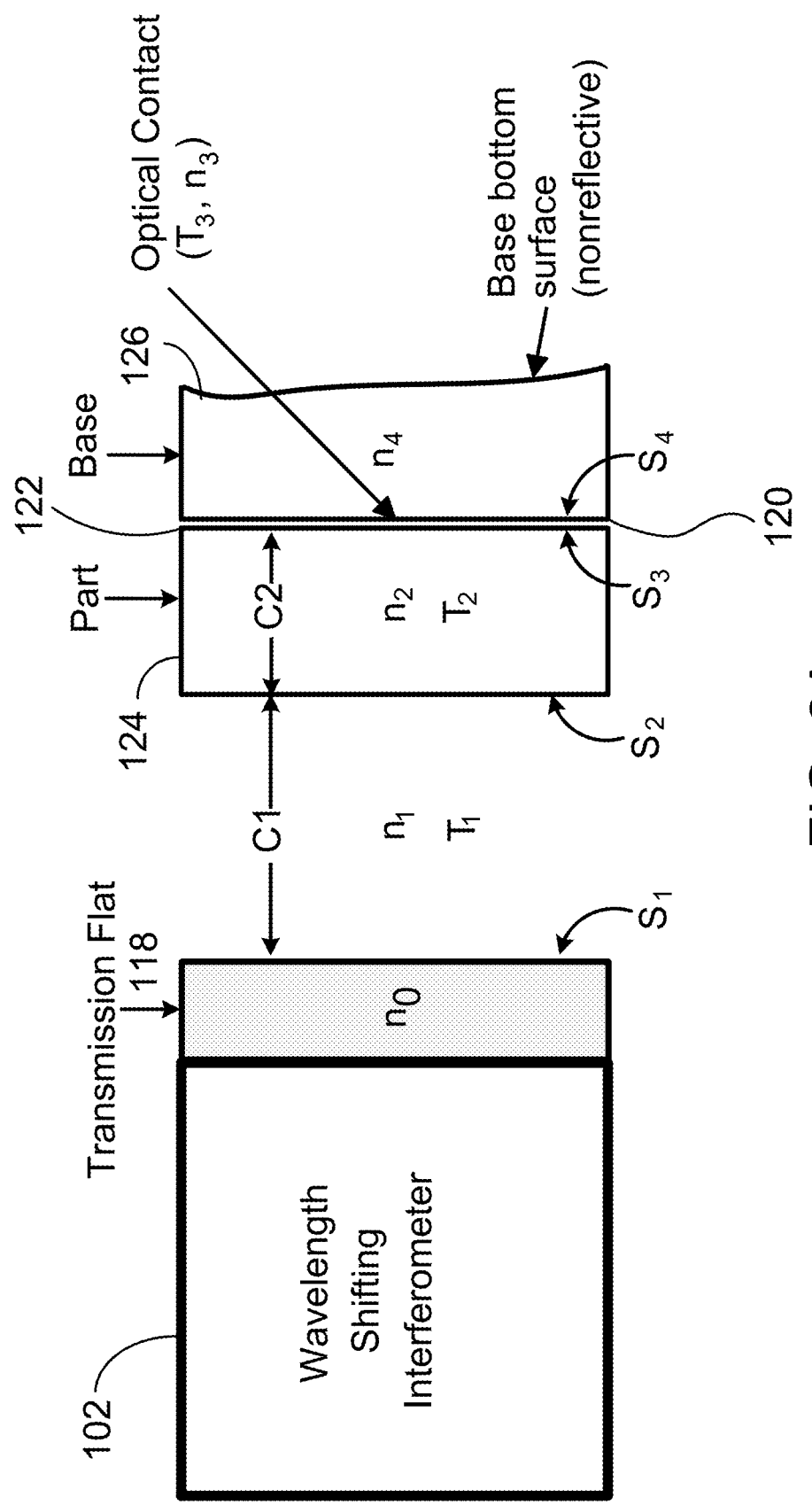
FIGS. 2A and 2B are diagrams of an example of a measurement geometry for the contact gap measurement system.
Figure 2B:
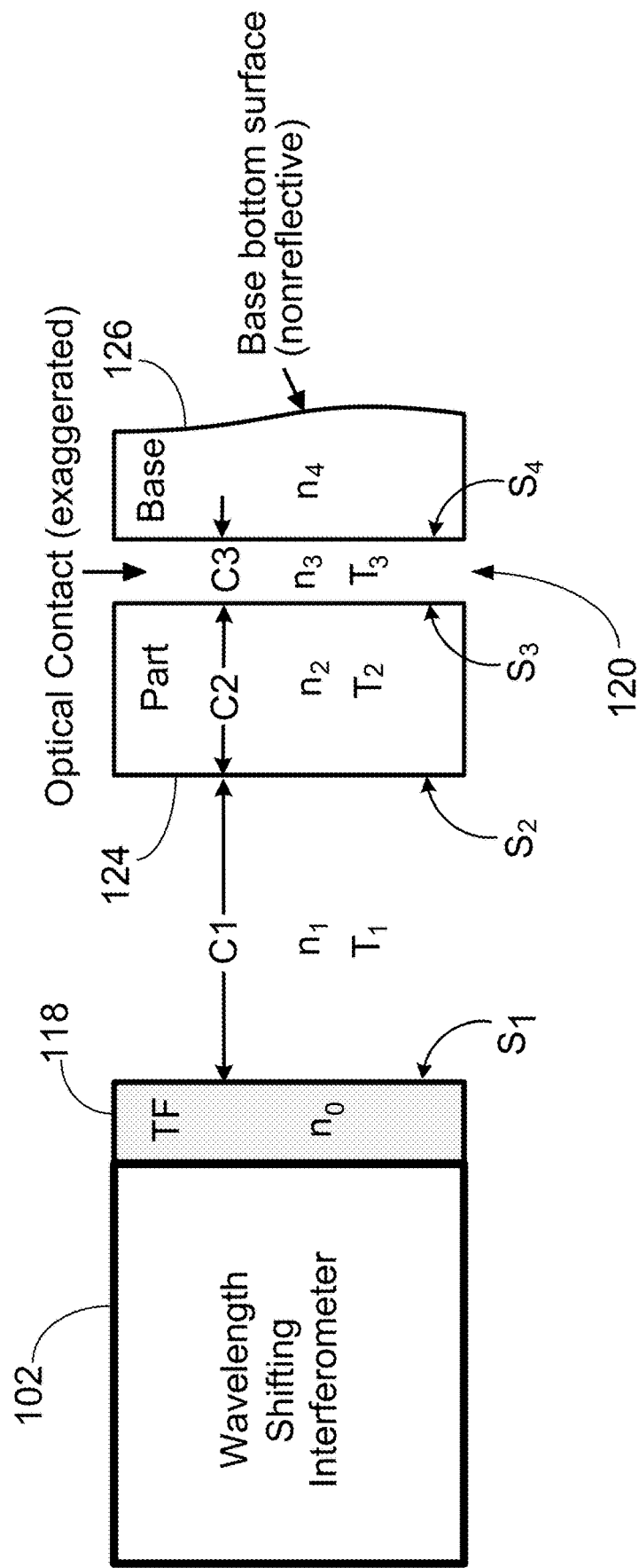

FIG. 2A is an enlarged diagram of the various surfaces related to the measurement of the contact gap. FIG. 2B is a diagram of the various optical elements shown in FIG. 2A with the optical contact enlarged and shown more clearly. Assuming the rear surface of the base 126 is not observed, the setup shown in FIGS. 2A, 2B is a 4-surface measurement geometry. Primary cavities C1 and C2 are formed between surfaces $S_1$:$S_2$ and $S_2$:$S_3$ respectively, and their physical thicknesses are denoted as $T_x$ (for x=0 to 4), but only the cavity C1 is length adjustable. The refractive indices ($n_x$) are assumed known. The optical part 124 and the base 126 can be made of the same material for thermal expansion compatibility, but this is not required. The optically contacted $S_3$:$S_4$ interface 122 is the feature of interest. The contact gap 120 is not directly resolvable given the tuning range limits of the tunable laser 104. Instead, the system 100 infers the contact gap 120 by measuring the interference amplitude of the cavity C2, using wavelength tuning with Fourier-transform phase shifting interferometry analysis methods. If the optical contact between $S_3$ and $S_4$ is perfect, the thickness $T_3$=0, the reflectivity of contacted interface 122 is reduced to zero and the interference amplitude of the cavity C2 becomes zero. If the optical contact between $S_3$ and $S_4$ is not perfect, the thickness $T_3$>0 and the effective reflectivity of the contacted interface 122—hence the C2 interference amplitude—will depend on the size of the thickness $T_3$.

Some of the laser light 116 reflected by the surfaces $S_1$ and $S_2$ that define the interferometer cavity C1 forms a first combined light signal. The intensity of the first combined light signal depends on the interference among the portions of the light reflected from the surfaces $S_1$ and $S_2$. When the wavelength of the laser light 116 changes, the interference of the portions of light reflected from the surfaces of the cavity C1 changes, so the intensity of the first combined light signal also changes. When the wavelength of the laser light 116 is linearly tuned from a smaller wavelength to a larger wavelength (or from a larger wavelength to a smaller wavelength) over a period of time, the first combined light signal will have an intensity that oscillates over the period of time, in which the frequency of the oscillation depends on the thickness $T_1$ of the cavity C1, and the amplitude of the oscillation (i.e., the amplitude of the AC component of the first combined signal) depends on the reflectivities of the surfaces of the cavity C1.

Similarly, some of the laser light 116 reflected by the surfaces $S_2$ and $S_3$ that define the cavity C2 forms a second combined light signal. The intensity of the second combined light signal depends on the interference among the portions of the light reflected from the surfaces $S_2$ and $S_3$. When the wavelength of the laser light 116 changes, the interference of the portions of light reflected from the surfaces of the cavity C2 changes, so the intensity of the second combined light signal also changes. When the wavelength of the laser light 116 is linearly tuned from the smaller wavelength to the larger wavelength (or from the larger wavelength to the smaller wavelength) over the period of time, the second combined light signal will have an intensity that oscillates over the period of time, in which the frequency of the oscillation depends on the thickness $T_2$ of the cavity C2, and the amplitude of the oscillation depends on the reflectivities of the surfaces of the cavity C2.

The detection module 108 measures the intensity of the light reflected from the surfaces $S_1$, $S_2$, $S_3$, and $S_4$ to generate a detection signal. The detection signal includes a first component that corresponds to the first combined light signal, and a second component that corresponds to the second combined light signal. The first component has a frequency that depends on the thickness T1 of the cavity C1, and the second component has a frequency that depends on the thickness T2 of the cavity C2. When a spectral analysis is applied to the detection signal, the resulting spectrogram includes a first peak (e.g., 174 in FIG. 7) associated with the cavity C1 and a second peak (e.g., 172 in FIG. 7) associated with the cavity C2. Because the thicknesses T1 and T2 are known, it is possible to determine which peak in the spectrogram is associated with the cavity C1 and which peak in the spectrogram is associated with the cavity C2.

The amplitude of the oscillation of the first component depends on the intensity of the laser light 116 and the reflectivities of the surfaces of the cavity C1. The amplitude of the oscillation of the second component depends on the intensity of the laser light 116 and the reflectivities of the surfaces of the cavity C2. The amplitude of the first oscillation component, defined by the first peak in the spectrum, can be used as a reference, in which the ratio of the amplitude of the second oscillation component, defined by the second peak in the spectrum, to the amplitude of the first peak is independent of the intensity of the laser light 116. The reflectivities of the surfaces $S_1$ and $S_2$ depends on the refractive index n0 of the transmission flat 118, the refractive index n1 of air in the cavity C1, and the refractive index n2 of the optical part 124, all of which have known values. The effective reflectivity of the surface $S_3$ depends on the refractive index n2 of the optical part 124 (which has a known value) and also depends on the bond gap or contact gap 120 (which is unknown).

As described in more detail below, a theoretical optical model can be established to represent the relationship between the bond gap 120 and the ratio of the amplitude of the second peak to the amplitude of the first peak in a theoretical spectrogram associated with the interferometer cavities under consideration. In order to determine the actual bond gap 120 of a particular contact bond, wavelength tuning is used to sweep the wavelength of the laser light 116, and spectral analysis is applied to the detection signal output by the detection module 108. The first peak associated with the first cavity C1 and the second peak associated with the second cavity C2 are identified, the amplitudes of the first and second peaks are measured, the ratio of the amplitude of the second peak to the amplitude of the first peak is determined, and the bond gap or contact gap 120 is determined based on the theoretical optical model.

The following describes in more detail the process for determining the contact gap 120. In some implementations, the contact gap 120 can be determined by comparing the measured C2 interference amplitude with that predicted by a mathematical model of the cavity geometry with the contact gap 120 as a free parameter. An interference model is constructed from repeated applications of the familiar Airy formula for the effective field reflectivity from two parallel surfaces separated by a medium of index n and distance T with the illumination perpendicular to the surfaces.

$$\rho_{12} = \frac{\rho_1 + \rho_2 e^{\frac{4\pi i n T v}{c}}}{1 + \rho_1 \rho_2 e^{\frac{4\pi i n T v}{c}}} \quad (1)$$

where $\rho_{1,2}$ are the Fresnel field reflectivities of the two surfaces and $v = c/\lambda$ is the optical frequency of the illumination. Using the variables defined in FIGS. 2A, 2B, starting from the last two surfaces (e.g., $S_4$ and $S_3$) and working towards the first surface (e.g., $S_1$) by applying Eq. (1) three times, the interference intensity model for the full cavity geometry is $$I = \left| \frac{\rho_1 + \rho_{23} e^{\frac{4\pi i n_1 T_1 v}{c}}}{1 + \rho_1 \rho_{23} e^{\frac{4\pi i n_1 T_1 v}{c}}} \right|^2 \text{ with } \rho_{23} = \frac{\rho_2 + \rho_{34} e^{\frac{4\pi i n_2 T_2 v}{c}}}{1 + \rho_2 \rho_{34} e^{\frac{4\pi i n_2 T_2 v}{c}}}, \quad (2)$$

$$\rho_{34} = \frac{\rho_3 + \rho_4 e^{\frac{4\pi i n_3 T_3 v}{c}}}{1 + \rho_3 \rho_4 e^{\frac{4\pi i n_3 T_3 v}{c}}}, \rho_x = \frac{n_{x-1} - n_x}{n_{x-1} + n_x}$$

where $\rho_x$ is the Fresnel field reflectivity of surface x for illumination normal to the surface.

The theoretical model above predicts interference intensity as a fraction of the absolute input intensity. In real systems, the illumination intensity is generally not absolutely known or temporally or spatially uniform. Furthermore, the interference is measured with detectors (e.g., the detection module 108) and electronics (e.g., the acquisition module 110) that are linear but possess a limited dynamic range and are not absolutely calibrated. In some examples, these effects make it impractical to compare absolute values for intensity. Instead, the system 100 compares cavity intensity amplitude ratios to cancel the unknown absolute quantities. The system 100 compares the ratio of the interference amplitudes of cavities C1 and C2 with the theoretically expected value as a function of the contact gap 120. The contact gap 120 for which the ratios agree is taken as the measured contact gap. Here is where wavelength tuning is advantageous, since the interference amplitude for both cavities C1 and C2 can be measured simultaneously under identical illumination conditions for every pixel of the detection module 108 common to both cavities C1 and C2. The C1 cavity length $T_1$ should be set to minimize harmonic overlap for both the C1 and C2 cavities.

Figure 3:
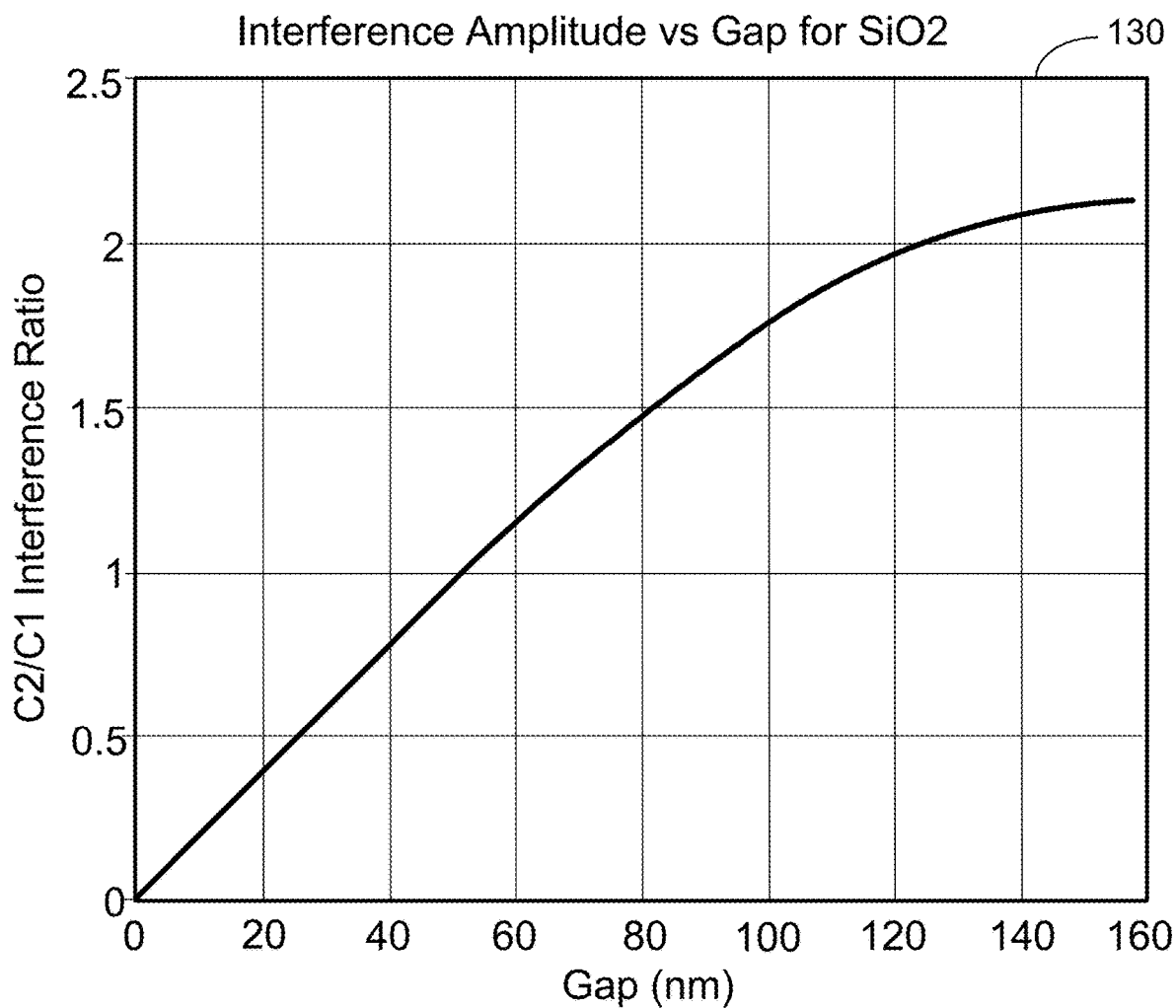
FIG. 3 is a diagram of an example of interference amplitude ratio versus the contact gap assuming the part and base material is $SiO_2$.

FIG. 3 is a graph 130 that shows an example of the interference amplitude ratio CR=C2/C1 versus the contact gap 120 for the geometry discussed above assuming the transmission flat 118, the optical part 124, and the base 126 are all made of fused silica ($SiO_2$). The ratio C2/C1 rises approximately linearly for small contact gaps 120 with a slope of about 0.02/nm then slows, reaching a value of 2.13 at a contact gap 120 of $\lambda/4$ before falling again to near zero at $\lambda/2$. This behavior is typical of many glasses and indicates that the method is useful in determining the contact gap for separations less than $\lambda/4$ using interference amplitude alone. This is generally not a significant restriction since separations beyond a few nanometers are insufficient to produce a durable bond due to the inherently weak attractive strength and short range of intermolecular forces.

In some implementations, the swept wavelength tunable laser 104 can have a center wavelength of, e.g., 633 nm, and an optical frequency tunable range of about 200 GHz, representing a wavelength range of about 0.267 nm. Other tunable sources with different mean wavelengths and different tuning ranges can also be used. For example, a swept wavelength tunable laser having a center wavelength of 1550 nm can have a tunable range of about 4 nm (1548 nm to 1552 nm).

The swept wavelength tunable laser 104 sweeps (or tunes) the wavelength linearly in optical frequency to produce constant frequency interference for each cavity in the measurement geometry. As the wavelength of the laser beam 116 is varied, the amplitude of the light detected by the detection module 108 varies due to changes in the interference conditions. When the wavelength is tuned linearly in optical frequency, the interference amplitude detected by the detection module 108 varies periodically at a constant frequency. The interference frequencies depend on the optical characteristics of the cavities (e.g., C1 and C2). A Fourier analysis of the interference intensity acquired by the acquisition module 110 during such a tune can be spectrally analyzed to extract the interference amplitude for each cavity individually. For nonlinear tunes, an OPD transform rather than a Fourier transform can be employed. Additional information on methods for performing spectral analysis of the measurements to extract the interference amplitude information for each cavity can be found in L. Deck, "Fourier-Transform Phase Shifting Interferometry," Appl. Opt. 42(13), 2354-2365 (2003), the entire content of which is herein incorporated by reference.

Materials with absorption or scatter can also be used if the appropriate complex index is used in Eq. (2). The method for determining the contact gap 120 can also be used in applications that use different materials for the optical part 124 and the base 126, however in those cases the contact interface 122 reflectivity amplitude as a function of the contact gap 120 never reduces to zero and the resulting loss in dynamic range in the interference amplitude ratio increases the noise in the measured contact gap.

The inclusion of the cavity C1 in the measurement geometry, though simplifying the measurement to a single acquisition and removing the dependence on absolute intensity, has one disadvantage. The internal interference generated by an inline C1 cavity consumes much of the available intensity dynamic range and limits the usable optical power to avoid detector saturation. Since the C2 cavity interference is already weak (particularly if the contact is good), this lowers the signal-to-noise ratio of the C2 interference amplitude. Fortunately, Fourier processing is excellent for extracting weak periodic signals and the inventive method delivers good performance with the cavity C1 inline.

The signal-to-noise ratio for the C2 interference amplitude can be improved by splitting the measurement into two stages, one with low optical intensity and C1 inline and a second one with increased intensity and C1 removed (which can be accomplished by angling the transmission flat 118 off-axis). For typical glasses one can usually realize a 3× to 4× increase in the signal-to-noise ratio if there is sufficient intensity to spare. The one caveat is that one should know how much the intensity was increased between the two measurements and account for Fresnel losses if the transmission flat 118 is simply angled off-axis rather than removed. The first measurement with the cavity C1 inline determines the contact region and the interference amplitude ratio at a particular input intensity. In critical applications the added effort can produce improved measurement results.

In the description above, the rear surface of the base 126 is assumed to be non-reflective. If the rear surface of the base 126 also reflects into the interferometer 102, then that surface should be included in the model. In that case the measurement geometry consists of 5 surfaces and the additional cavities formed will further reduce the dynamic range available for the C2 cavity interference. In addition, the possibility of spectral overlap between the cavities of interest (C1 and C2) and any unknown parasitic cavities and their harmonics increases. For these reasons, optical geometries with the fewest contributing surfaces are preferred.

Figure 4A:
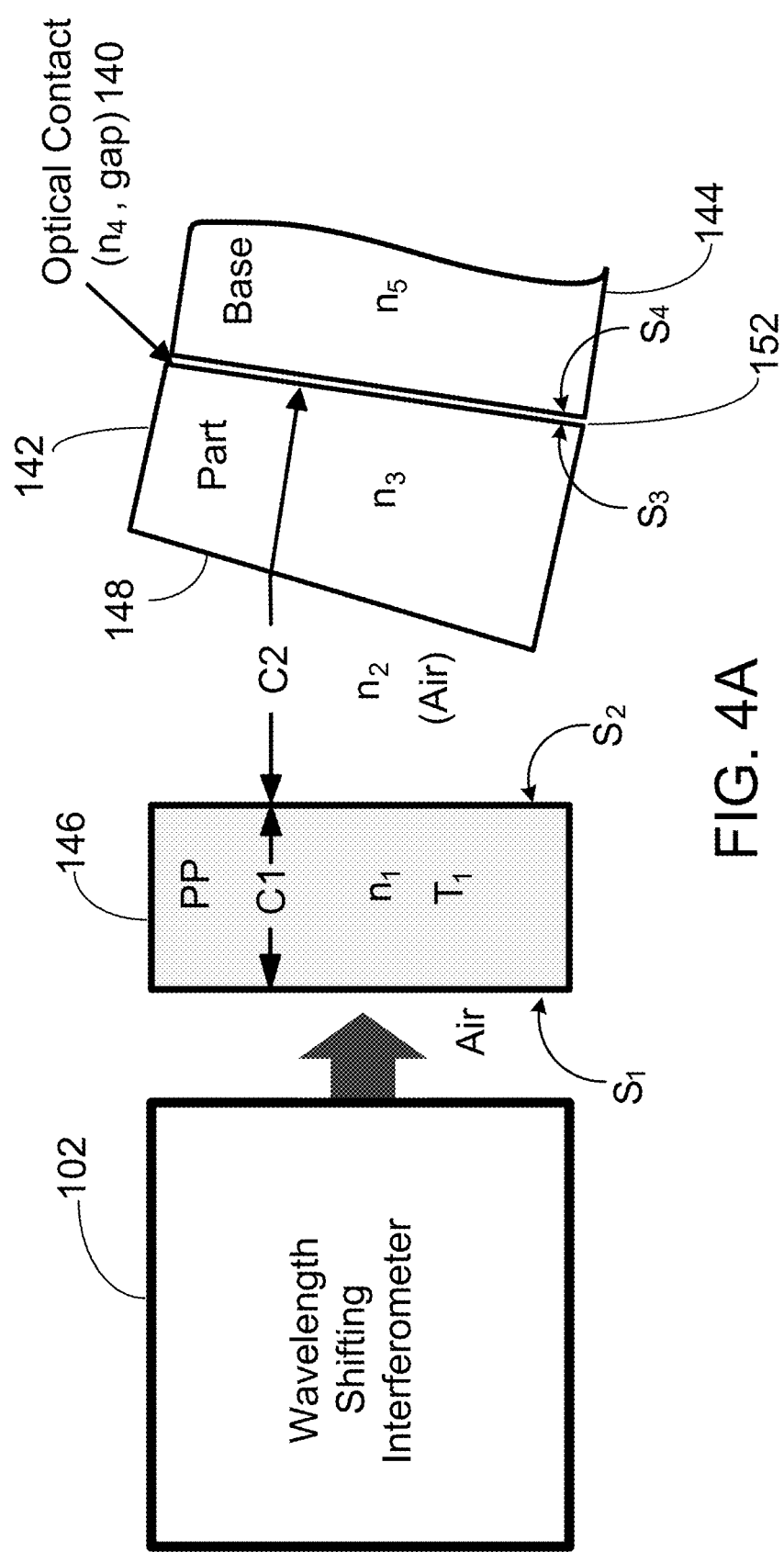
FIGS. 4A and 4B are diagrams of an example of a measurement geometry for the contact gap measurement system.
Figure 4B:
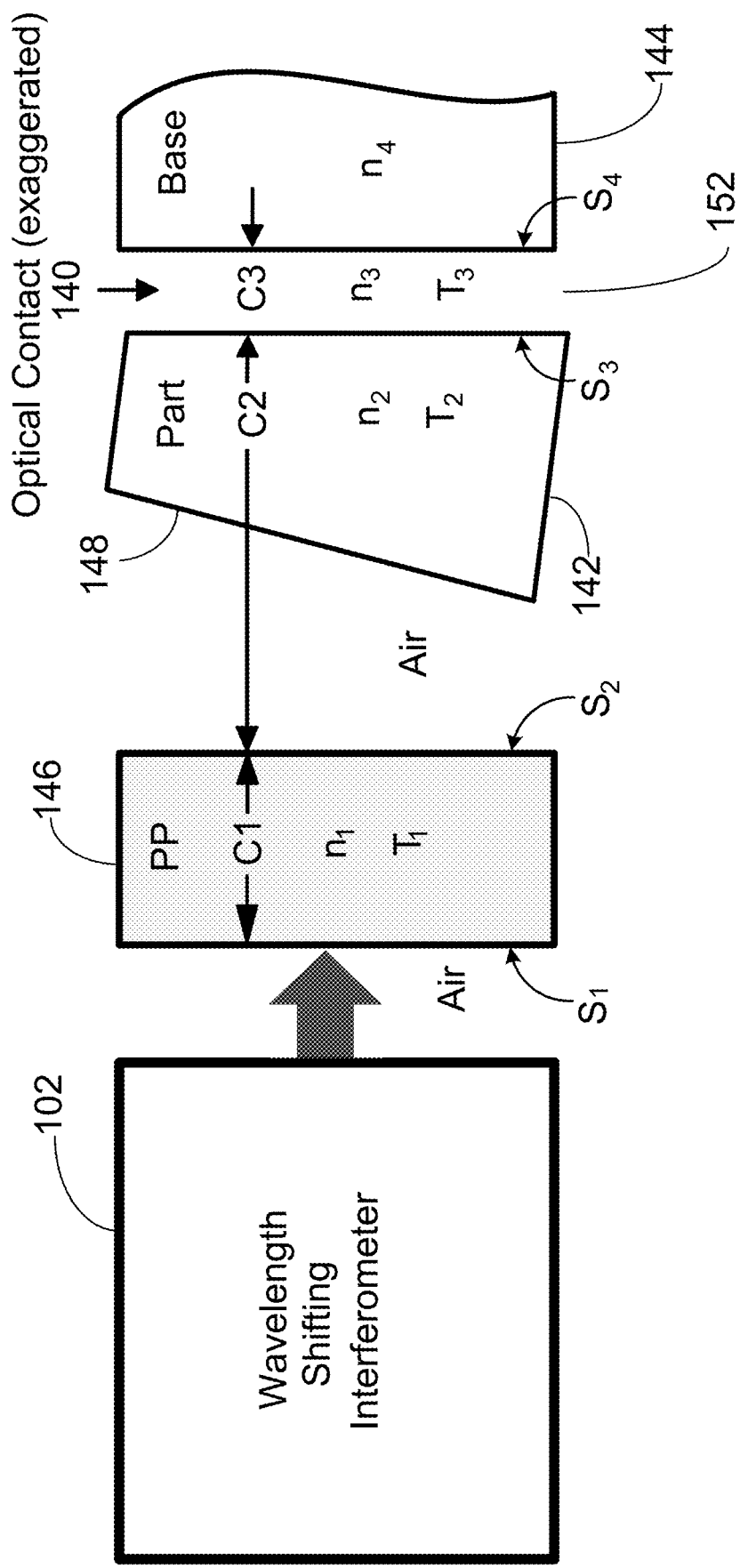

The geometry of FIGS. 2A and 2B assumes a conformal optical part 124 (e.g., similar to a parallel plate) and used one surface of the optical part 124 ($S_2$) to form the C2 cavity that interrogates the bonded interface 122. For non-conformal optical parts, such as wedges, a slightly modified measurement geometry, such as the one illustrated in FIG. 4A, can be used. Referring to FIG. 4A, an optical contact is formed between a rear surface $S_3$ of a non-conformal optical part 142 and a front surface $S_4$ of a base 144. FIG. 4B is a diagram of the various optical elements shown in FIG. 4A with the optical contact enlarged and shown more clearly. The contact gap 152 to be determined is the distance between the surfaces $S_3$ and $S_4$. The optically contacted $S_3:S_4$ interface 140 is the feature of interest. A polished parallel plate (PP) 146 of known material replaces the transmission flat 118 (FIGS. 2A, 2B) to form a cavity C1. The contacted part (142 and 144) is oriented so that the contact surface 140 is normal to the illumination wavefront. The rear surface $S_2$ of the parallel plate 146 and the contacted interface 140 form a cavity C2. The C2 cavity optical path length will depend on field position, but the interference amplitude remains unaffected. Reflections from the front surface 148 of the optical part 142 are rejected by the imaging stop.

Alternatively, as previously discussed, the measurement of the contact gap can be split into two measurements as shown in FIGS. 5A and 5B. Referring to FIG. 5A, the first measurement establishes the interference amplitude and optical intensity baseline across the aperture with a cavity C1 whose optical characteristics are known and easily modelled. In this example, the cavity C1 is formed between the rear surface $S_1$ of the transmission flat 118 and a front surface $S_2$ of a reference flat 150. The transmission flat 118 and the reference flat 150 can be made of the same material (and have the same refractive index) or be made of different materials (and have different refractive indices).

Referring to FIG. 5B, the second measurement measures the interference between the transmission flat 118 and the contacted interface 140 under illumination conditions that are known relative to the first measurement. The contacted part (142 and 144) is oriented so that surface 140 is normal to the illumination wavefront. Compared to FIG. 4A and FIG. 4B, the fewer number of reflecting surfaces means that the second measurement illumination power can be substantially increased, increasing the signal-to-noise ratio of the C2 cavity measurement. The measurement system tracks the changes in illumination power between the first and second measurements for proper scaling.

Figure 6:
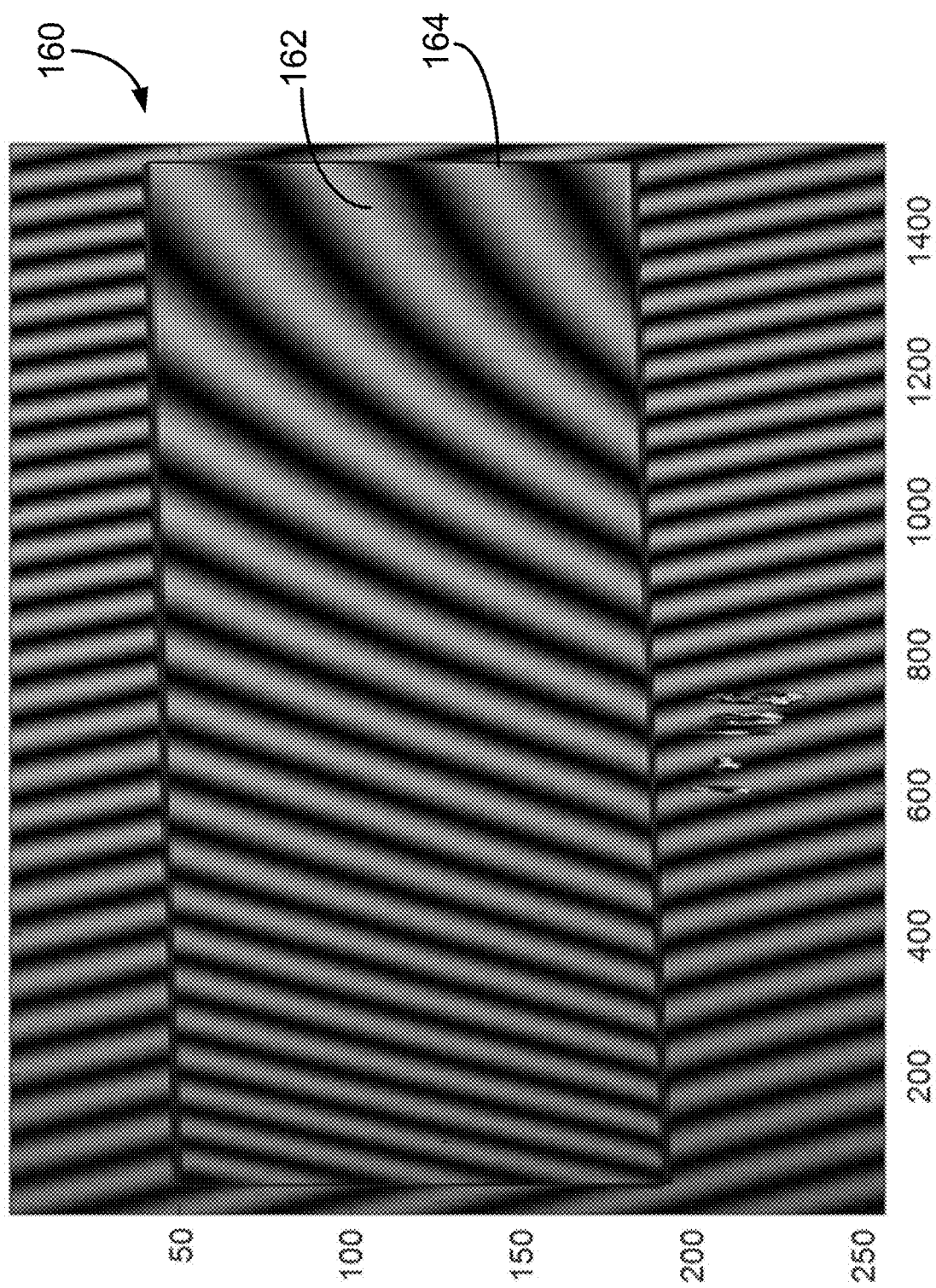
FIG. 6 is a Fizeau static interferogram.

The following describes an example of measurements that were performed using the inventive method described above for an optical contact between a parallel plate 34 mm thick and a base both made of Zerodur using the measurement geometry shown in FIGS. 2A, 2B. FIG. 6 is a static interferogram 160 observed in a Fizeau interferometer for the contacted assembly. The Fizeau interferometer used a transmission flat 118 made of $SiO_2$ approximately 254 mm from the front surface 148 of the optical part 142. The static interferogram 160 includes fringes 162 in the contacted region 164 (center), which indicate good contact since they appear to be single cycle (2-surface) interference.

Figure 7:
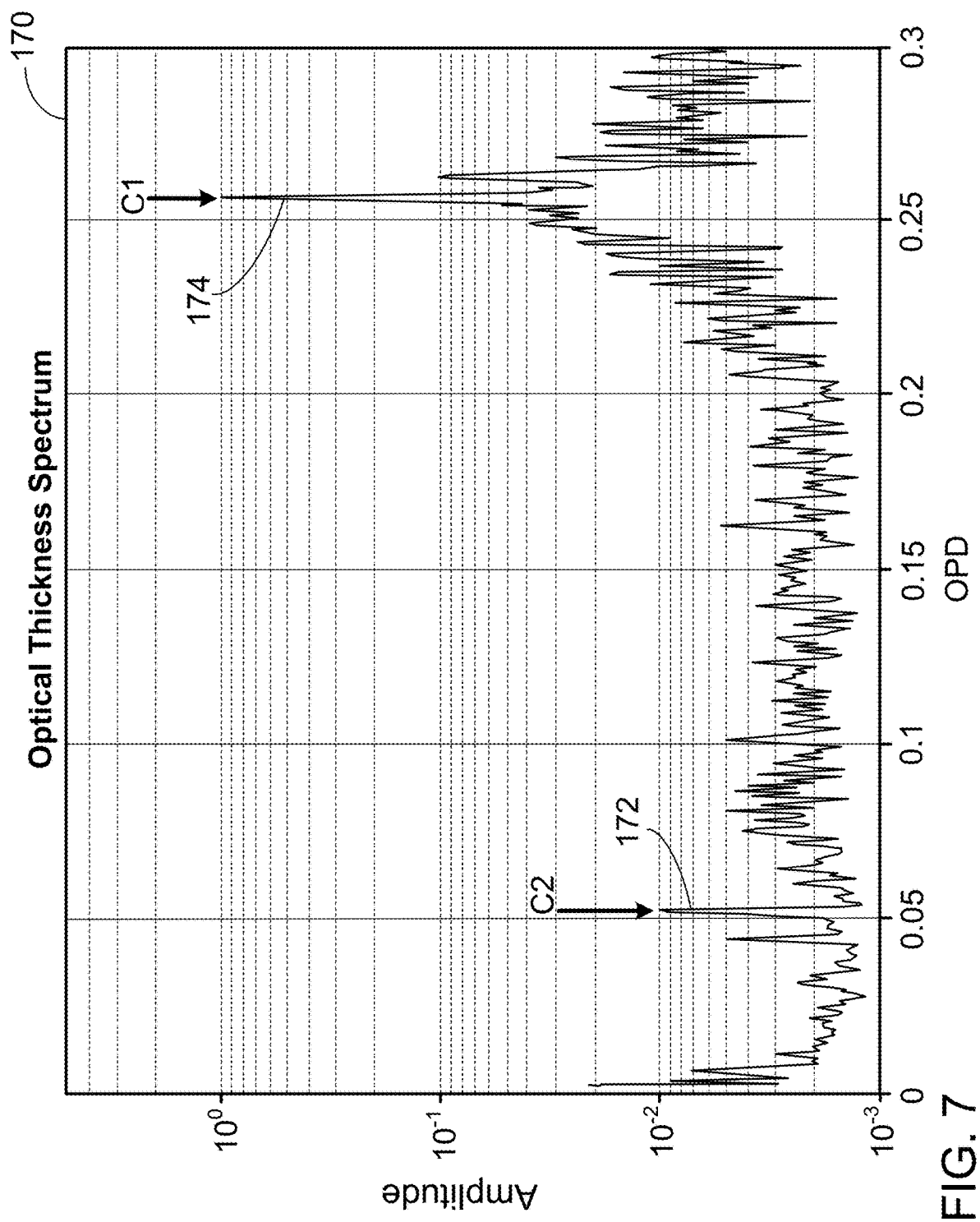
FIG. 7 is a graph of an optical thickness spectrum.

The measurements included acquiring 2000 camera frames over a tune of 200 GHz for the swept wavelength tunable laser 104. The tuning range was maximized to increase spectral resolution and minimize the possibility of spectral overlap. FIG. 7 is a graph 170 showing a typical optical thickness spectrum for a pixel in the contacted regions. The graph 170 is plotted on a semilog scale to make the C2 peak 172 visible against the more prominent C1 peak 174. For best results, spectral peaks from extraneous unanticipated cavities in the geometry should be well separated from the peaks of interest.

Zerodur has an intensity transmission coefficient of 0.993/mm, the value representing a small intensity loss due to internal Rayleigh scattering at λ=633 nm, the mean wavelength used in the experiment. For accurate gap estimates it is important to include this loss by adding a small imaginary part η to the refractive index, whose value can be estimated using the known transmission coefficient via the following equation:

$$\eta = \frac{-\lambda \ln(\sqrt{0.993})}{2\pi(1 \text{ mm})} = 3.538 \cdot 10^{-7} \quad (3)$$

The propagation kernel for an optical field is $\exp(i2\pi Ln/\lambda)$ where n is a complex index $n = n0 + i\eta$, L is the propagation length and λ is the wavelength. The imaginary part of the index controls the transmission amplitude. The transmission amplitude which occurs after propagating a distance L is thus $\exp(-2\pi L\eta/\lambda)$, and the intensity transmission is the square of that, $\exp(-4\pi L\eta/\lambda)$. The value of the intensity transmission should be equal to the value of 0.993 for L=1 mm, so $0.993 = \exp(-4\pi(1 \text{ mm})\eta/\lambda)$. Solving for η produces Eq. (3) above.

Figure 8:
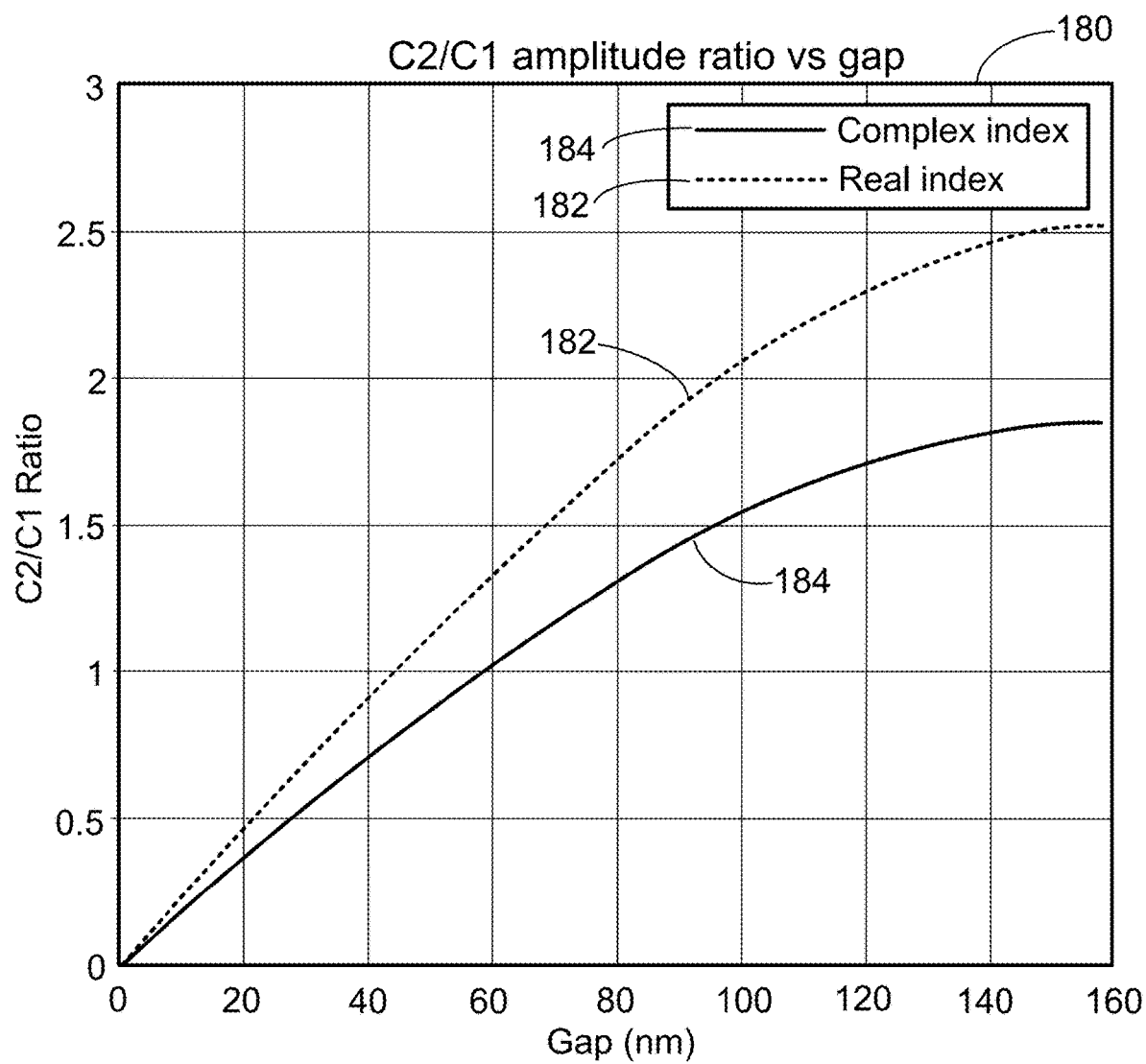
FIG. 8 is a graph of the theoretical C2/C1 interference amplitude ratio as a function of contact gap for the Zerodur part assuming a purely real refractive index or the more accurate complex index that accounts for internal losses.

FIG. 8 is a graph 180 of the theoretical C2/C1 interference amplitude ratio as a function of contact gap for the Zerodur part assuming a purely real refractive index or the more accurate complex index that accounts for internal losses. The graph 180 illustrates the difference the small intensity loss due to internal Rayleigh scattering makes to the theoretical interference amplitude ratio versus gap. The graph 180 includes a curve 182 representing the relationship between the interference amplitude ratio CR=C2/C1 and the contact gap 120 when a purely real refractive index is used. A curve 184 represents the relationship between the interference amplitude ratio CR=C2/C1 and the contact gap 120 when the more accurate complex refractive index that accounts for the intensity losses is used.

Figure 9B:
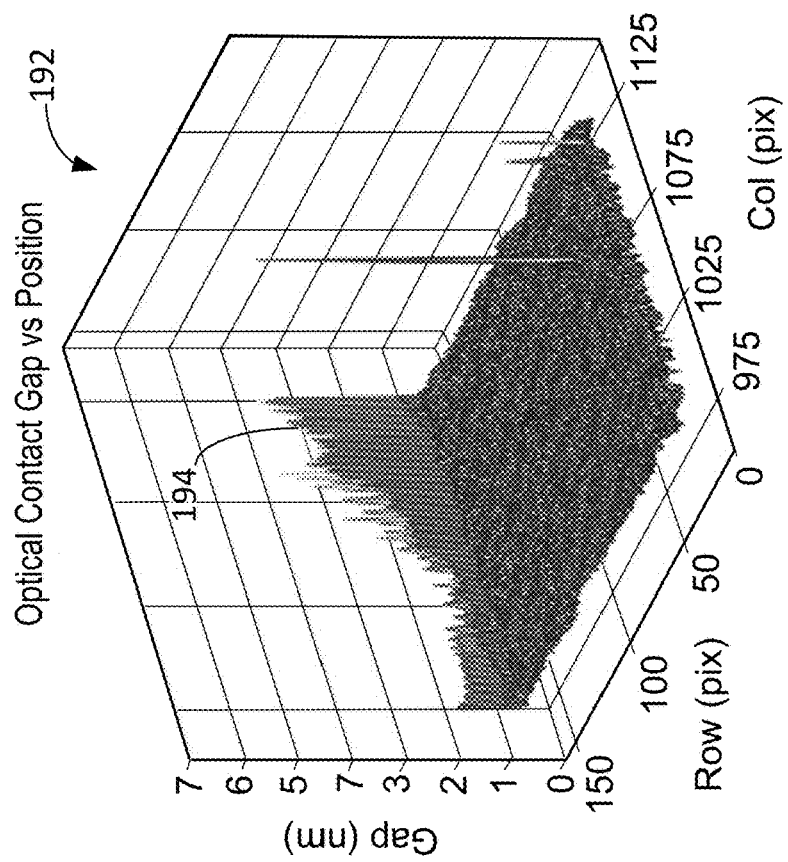
FIG. 9B is a graph of an enlarged portion of the map in FIG. 9A showing the edge lift and a few points of particle contamination.
Figure 9A:
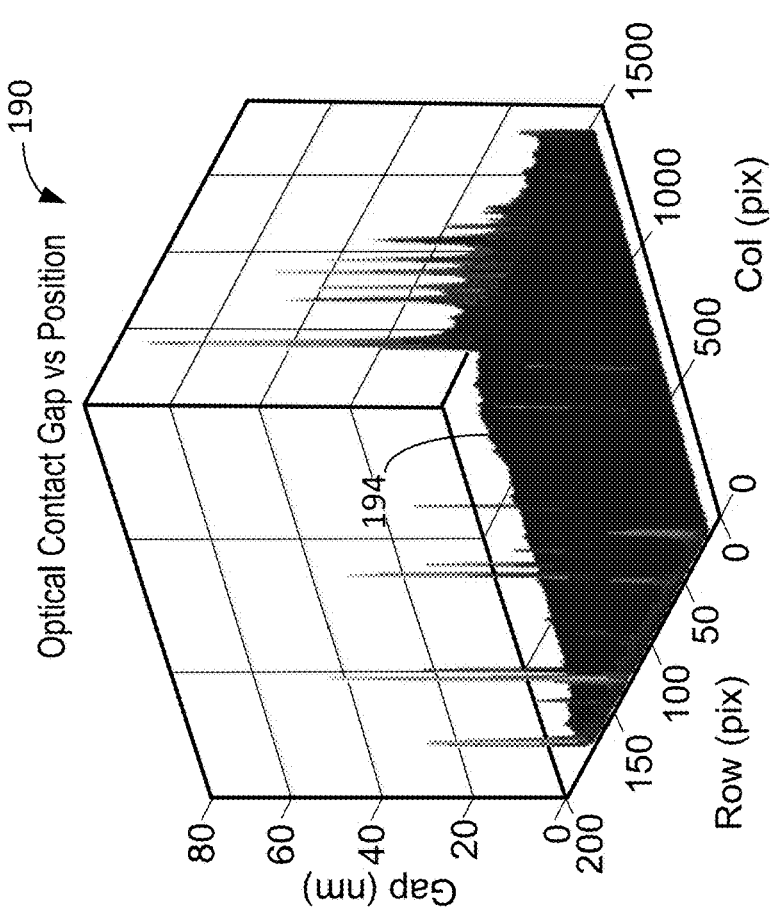
FIG. 9A is a graph of an example of a map of the measured gap in the full contact region.

The ratio of the amplitudes at peaks associated with the cavities C1 and C2 (determined using the optical thickness spectrum, e.g., 170 of FIG. 7) is used with the graph 180 of FIG. 8 to determine the contact gap (e.g., 120, 152) at every pixel in the field. FIG. 9A is a graph 190 that plots the contact gap map from this analysis in the optical contact region. Most image points show good contact, with a gap of about 0.5 nm. Some locations show a larger gap where a bubble or particle is trapped between the surfaces. Additionally, "edge lift" is observed at the edges 194 of the contact region, though that could be influenced by edge shadowing. FIG. 9B is a graph 192 that shows an enlarged portion of the edge 194 of the contact region and more clearly shows the edge lift and a few points of particle contamination. Spontaneous liftoff of contacted parts is a known problem for contacted surfaces and is assumed to be due to contaminants, starting at the edges, which compromise the contact bond over time. Sealing the edges with a small amount of optical cement has been found to be good protection against this. This visual evidence supports that explanation.

Figure 10:
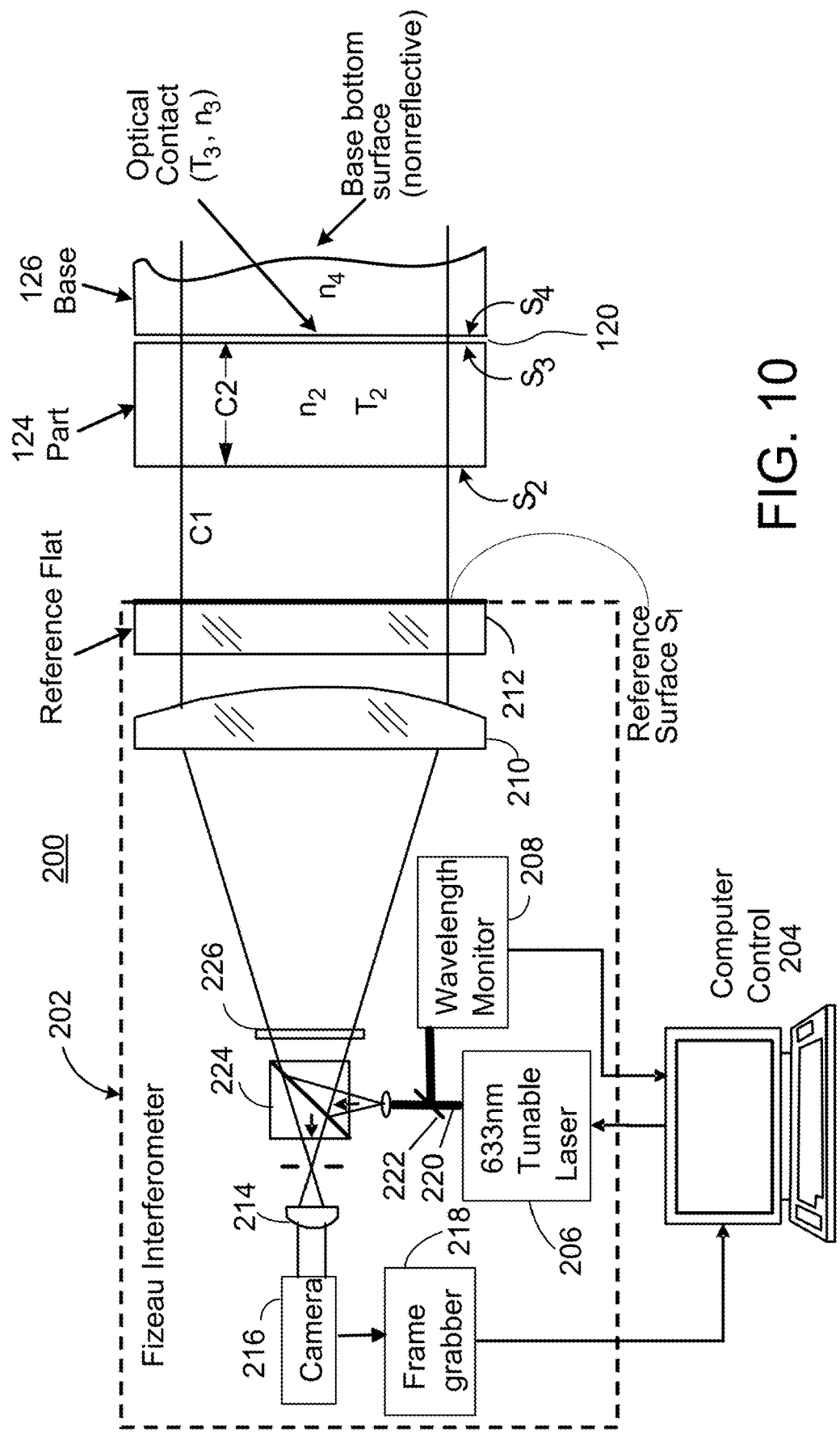
FIG. 10 is a block diagram of an example of a contact gap measurement system.

FIG. 10 is a diagram of an example of a contact gap measurement system 200 that is suitable for measuring a bond gap 120 of an optical contact between an optical part 124 and a base 126, in which the bond gap 120 can be, e.g., less than 1 μm, less than 100 nm, or less than 10 nm. In some implementations, the system 200 includes a Fizeau interferometer 202 and a control computer 204. The Fizeau interferometer 202 includes a tunable laser 206, a wavelength monitor 208, a first lens 210, a reference flat or transmission flat 212, a second lens 214, a camera 216, and a frame grabber 218. The tunable laser 206 can have a center wavelength at, e.g., 633 nm, and a tunable optical frequency range of 200 GHz, corresponding to a wavelength range of about 0.267 nm. Other lasers can be used with different mean wavelengths and tuning ranges. The laser 206 outputs a laser beam 220, in which a portion is diverted by a beam splitter 222 to the wavelength monitor 208 to monitor the wavelength of the laser beam 220. The output of the wavelength monitor 208 is sent to the control computer 204, which controls the tunable laser 206 to output the laser beam 220 at a specified wavelength. The control computer 204 controls the tunable laser 206 to linearly tune the wavelength and monitors the output of the tunable laser 206 through the wavelength monitor 208.

For example, the tunable laser 206 produces linearly polarized light, a polarizing beam splitter cube 224 and quarter-waveplate 226 combination directs the laser beam 220 towards the first lens 210, which outputs a collimated beam through the reference flat 212 to the optical part 124. The reflected light beam passes the partially reflective mirror 224 and is collimated by the second lens 214 and projected towards the camera 216, which can be a charge-coupled device (CCD) camera. The output of the camera 216 is sampled by the frame grabber 218, which outputs the image frames to the control computer 204. The control compute 204 applies a spectral analysis, such as Fourier-transform phase shifting interferometry analysis, to the image frames to determine the bond gap 120.

Figure 11:
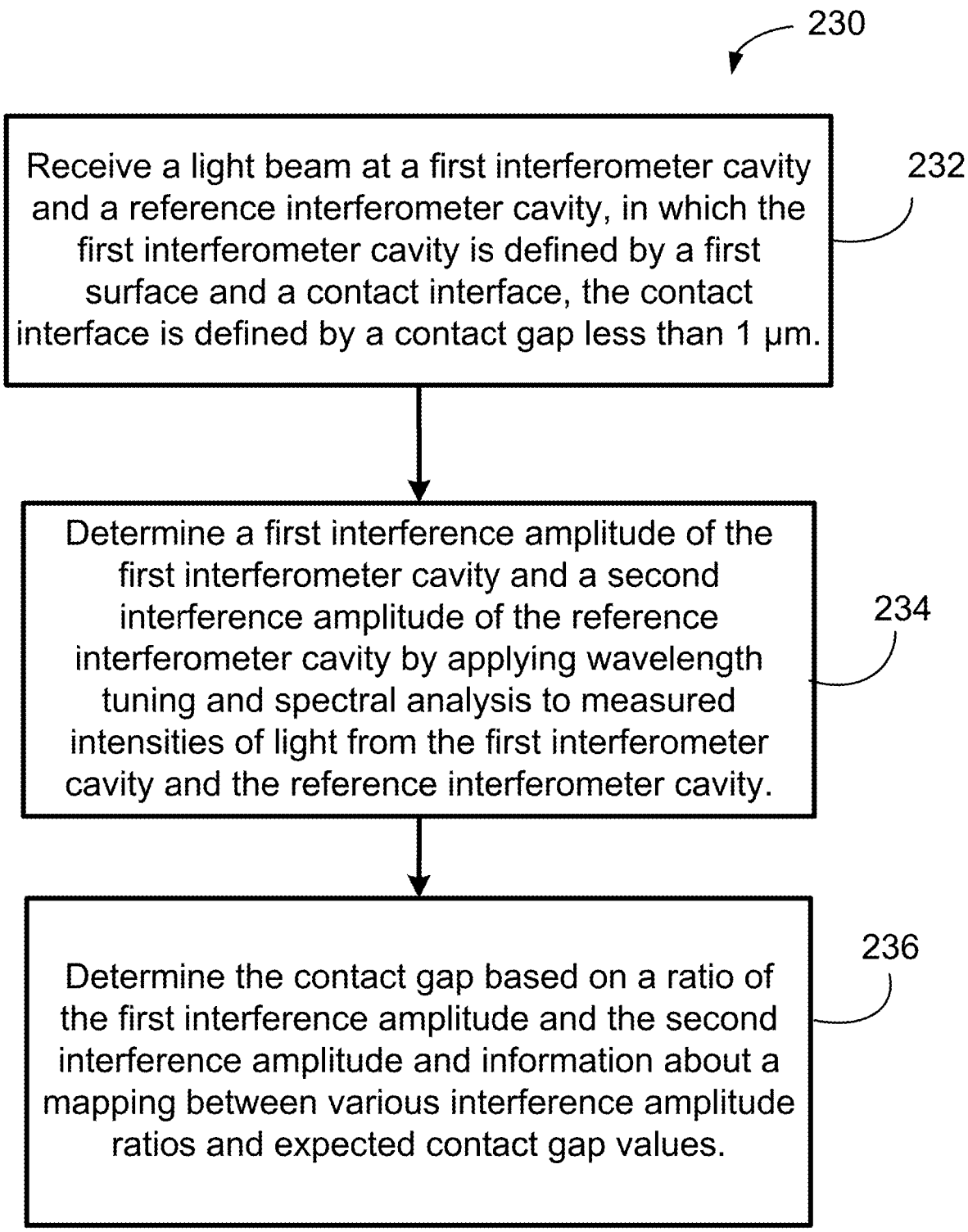
FIGS. 11 to 13 are flow diagrams.

FIG. 11 is a flow diagram of an example process 230 for measuring a contact gap. For example, the process 230 can be implemented using the system 100 of FIG. 1 or the system 200 of FIG. 10. The process 230 includes the following:

Receive 232 a light beam at a first interferometer cavity and a reference interferometer cavity, in which the first interferometer cavity is defined by a first surface and a contact interface, the contact interface is defined by a contact gap less than 1 μm.

For example, the light beam can be the light beam 116 (FIG. 1) or 220 (FIG. 10). The first interferometer cavity can be, e.g., the cavity C2 of FIG. 1, 2, 4A, 4B, 5A or 10. The reference interferometer cavity can be, e.g., the cavity C1 of FIG. 1, 2, 4A, 4B, 5B, or 10. The first surface can be, e.g., the surface $S_2$ of FIG. 1, 2, 4A, 4B, or 10, or the surface $S_1$ of FIG. 5B. The contact interface can be, e.g., the interface 122 of FIG. 1 or 2, the interface formed by the optical contact 140 of FIG. 4A, 4B, or 5B, or the interface formed by the optical contact formed between the surfaces $S_3$ and $S_4$ of FIG. 10. The contact gap can be the contact gap 120 of FIG. 1 or 10.

Determine at each image point 234 a first interference amplitude of the first interferometer cavity and a second interference amplitude of the reference interferometer cavity by applying wavelength tuning and spectral analysis to measured intensities of light from the first interferometer cavity and the reference interferometer cavity.

For example, the detection module 108 of FIG. 1 or the camera 216 of FIG. 10 can be used to measure the intensities of light. An example of the measurement of the intensities of light is the interferogram 160 of FIG. 6. An example of the results of applying the wavelength tuning and the spectral analysis to the measured intensities of light corresponding to one of the image locations (or pixels) is the spectrogram 170 of FIG. 7. The first interference amplitude can be the amplitude of the peak 174 of FIG. 7. The first interference amplitude can be the amplitude of the peak 172 of FIG. 7.

Determine 236 the contact gap based on a ratio of the first interference amplitude and the second interference amplitude and information about a mapping between various interference amplitude ratios and expected contact gap values.

An example of the mapping between various interference amplitude ratios and expected contact gap values is the graph 180 of FIG. 8, which shows the theoretical C2/C1 interference amplitude ratio as a function of contact gap. An example of contact gaps each determined based on a ratio of the first interference amplitude and the second interference amplitude and information about the mapping is shown in the graphs 190 (FIG. 9A) and 192 (FIG. 9B).

Figure 12:
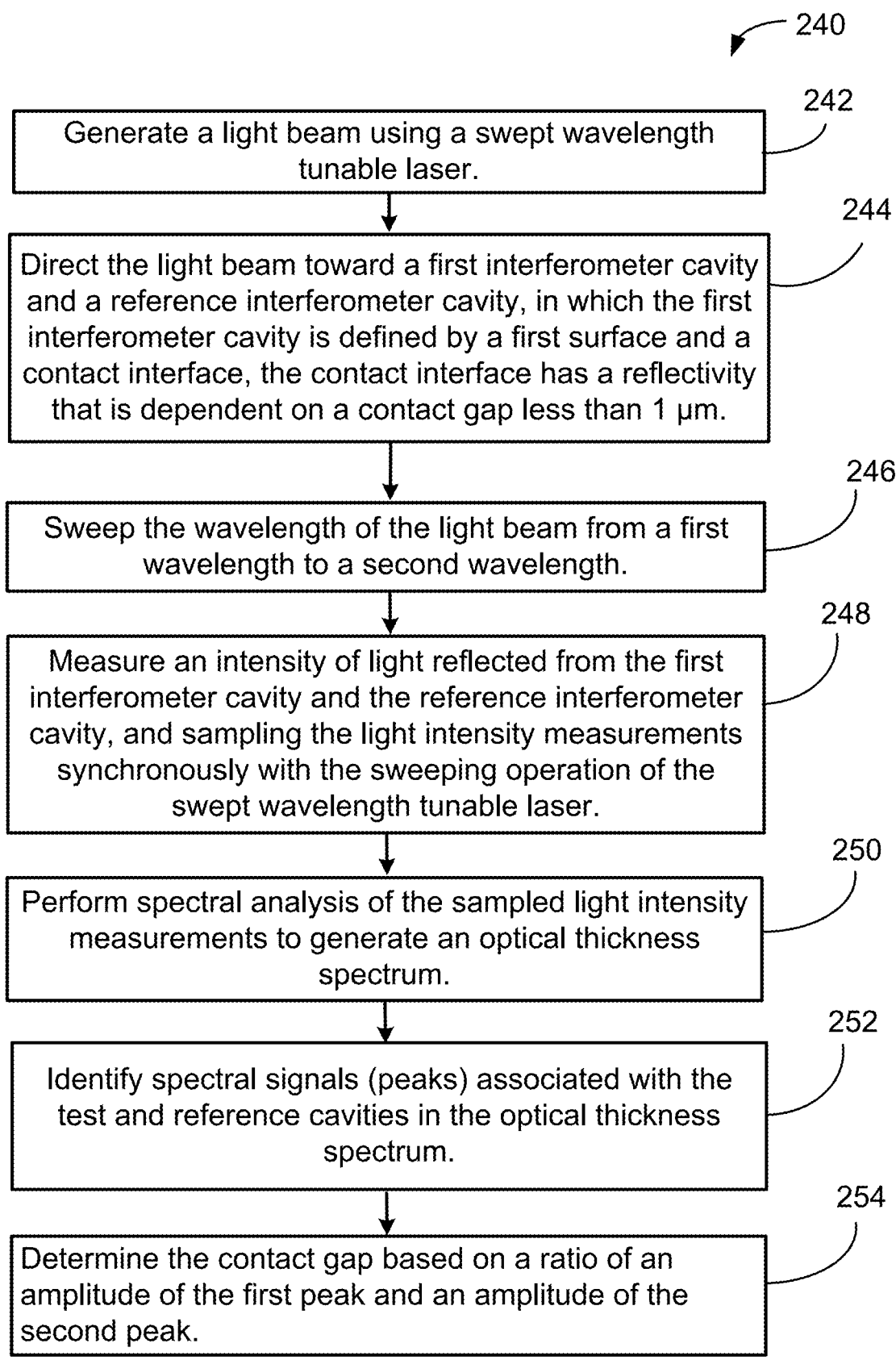

FIG. 12 is a flow diagram of an example process 240 for measuring a contact gap. For example, the process 240 can be implemented using the system 100 of FIG. 1 or the system 200 of FIG. 10. The process 240 includes the following:

Generate 242 a light beam using a swept wavelength tunable laser.

For example, the light beam can be the laser light 116 (FIG. 1) or 220 (FIG. 10). The tunable laser can be the tunable laser 104 (FIG. 1) or 206 (FIG. 10).

Direct 244 the light beam toward a first interferometer cavity and a reference interferometer cavity, in which the first interferometer cavity is defined by a first surface and a contact interface, the contact interface has a reflectivity that is dependent on a contact gap less than 1 µm.

For example, the first interferometer cavity can be, e.g., the cavity C2 of FIG. 1, 2, 4A, 4B, 5A or 10. The reference interferometer cavity can be, e.g., the cavity C1 of FIG. 1, 2, 4A, 4B, 5B, or 10. The first surface can be, e.g., the surface $S_2$ of FIG. 1, 2, 4A, 4B, or 10, or the surface $S_1$ of FIG. 5B. The contact interface can be, e.g., the interface 122 of FIG. 1 or 2, the interface formed by the optical contact 140 of FIG. 4A, 4B, or 5B, or the interface formed by the optical contact formed between the surfaces $S_3$ and $S_4$ of FIG. 10. The contact gap can be the contact gap 120 of FIG. 1 or 10.

Sweep 246 the wavelength of the light beam from a first wavelength to a second wavelength.

For example, the swept wavelength tunable laser 104 can sweep the wavelength of the laser light 116. For example, the control computer 204 can control the tunable laser 206 to sweep the wavelength of the laser light 220.

Measure 248 an intensity of light reflected from the first interferometer cavity and the reference interferometer cavity, and sampling the light intensity measurements synchronously with the sweeping operation of the swept wavelength tunable laser.

For example, the detection module 108 of FIG. 1 or the camera 216 of FIG. 10 can be used to measure the intensity of light. An example of the measurement of the intensities of light is the interferogram 160 of FIG. 6. The acquisition module 110 (FIG. 1) or the frame grabber 218 (FIG. 10) can be used to sample the light intensity measurements.

Perform 250 spectral analysis of the sampled light intensity measurements to generate an optical thickness spectrum.

An example of the results of applying the spectral analysis to the measured intensities of light corresponding to one of the image locations (or pixels) is the optical thickness spectrum 170 of FIG. 7.

Identify 252 spectral signals (peaks) associated with the test and reference cavities in the optical thickness spectrum.

An example of the first peak is the peak 174 of FIG. 7, and an example of the second peak is the peak 172.

Determine 254 the contact gap based on a ratio of an amplitude of the first peak and an amplitude of the second peak.

Figure 13:
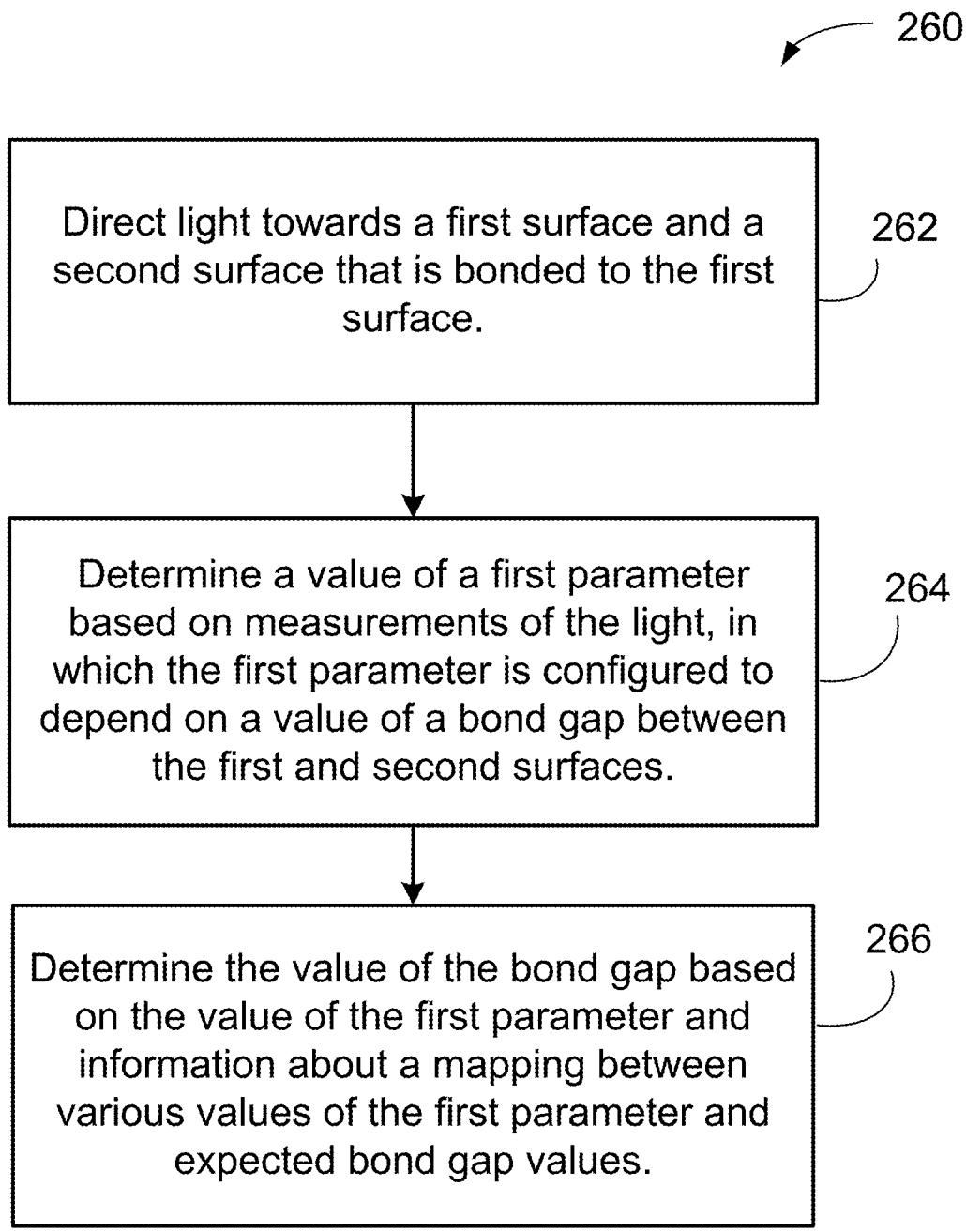

FIG. 13 is a flow diagram of an example process 260 for measuring a bond gap. For example, the process 260 can be implemented using the system 100 of FIG. 1 or the system 200 of FIG. 10. The process 260 includes the following steps.

Direct 262 light towards a first surface and a second surface that is bonded to the first surface.

For example, the light can be the laser light 116 (FIG. 1) or 220 (FIG. 10). The first surface can be, e.g., the surface $S_4$ of FIG. 1, 2, 4, or 10, or the surface $S_3$ of FIG. 5B. The second surface can be, e.g., the surface $S_3$ of FIG. 1, 2, 4, or 10, or the surface $S_2$ of FIG. 5B.

Determine 264 a value of a first parameter based on measurements of the light, in which the first parameter is configured to depend on a value of a bond gap between the first and second surfaces.

For example, the first parameter can represent a normalized amplitude of a spectral peak in a spectrogram generated by applying wavelength tuning and spectral analysis to measurements of the light reflected from the first surface, the second surface, and additional surfaces.

Determine 266 the value of the bond gap based on the value of the first parameter and information about a mapping between various values of the first parameter and expected bond gap values.

For example, the contact gap can be determined based on the ratio of the amplitude of the first peak and the amplitude of the second peak, and a mapping between various interference amplitude ratios and expected contact gap values. An example of the mapping between various interference amplitude ratios and expected contact gap values is shown in the graph 180 of FIG. 8.

A number of implementations have been described. Nevertheless, it will be understood that various modifications may be made without departing from the spirit and scope of the invention. In some implementations, the systems 100 and 200 can also be used to determine a gap of a bonding between two optical elements in which a glue with a known refractive index is used to bond the surfaces of the two optical elements. For example, equations 1 and 2 can still be used, in which the value used for $n_3$ changes from $n_3=1$ for an optical contact (air) to $n_3$=the index of the glue. The tunable laser 104 and 206 can have a center wavelength and a wavelength tuning range different from those described above.

In some implementations, the features described above related to processing of data, e.g., performing the Fourier-transform phase shifting interferometry, can be implemented by the processor 112 or the control computer 204, which can include one or more of digital electronic circuitry, computer hardware, firmware, and software. For example, some of the features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

The described features related to processing of data can be implemented advantageously in one or more computer programs that are executable on a programmable system including at least one programmable processor coupled to receive data and instructions from, and to transmit data and instructions to, a data storage system, an input device, and an output device. A computer program is a set of instructions that can be used, directly or indirectly, in a computer to perform a certain activity or bring about a certain result. A computer program can be written in any form of programming language (e.g., Fortran, C, C++, C#, Objective-C, Java, Python), including script, compiled, or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, flash memory devices, and 3D XPoint™ memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a liquid crystal display (LCD) or an organic light emitting diode (OLED) monitor for displaying information to the user and a keyboard and a pointing device such as a mouse or a trackball, or a touch or voice interface by which the user can provide input to the computer.

Although some implementations have been described above, other embodiments are also within the scope of the following claims. For example, the cavity designs can be different from those shown in FIGS. 2, 4, 5A, and 5B.

The invention claimed is:

1. A method comprising:
receiving a light beam at a first interferometer cavity and a reference interferometer cavity, in which the first interferometer cavity is defined by a first surface and a contact interface between a first optical element and a second optical element, the contact interface is defined by a contact gap less than 1 µm, the contact gap representing a distance between a surface of the first optical element and a surface of the second optical element;
determining a first interference amplitude of the first interferometer cavity and a second interference amplitude of the reference interferometer cavity by applying wavelength tuning and spectral analysis to measured intensities of light from the first interferometer cavity and the reference interferometer cavity; and
determining the contact gap based on a ratio of the first interference amplitude and the second interference amplitude and information about a mapping between various interference amplitude ratios and expected contact gap values.

2. The method of claim 1 in which the spectral analysis comprises Fourier-transform phase shifting interferometry analysis of interference intensity measured over a period of time.

3. The method of claim 1 in which the contact gap is less than 100 nm.

4. The method of claim 1 in which the contact gap is less than 10 nm.

5. The method of claim 1 in which measuring the first interference amplitude of the first interferometer cavity and the second interference amplitude of the reference interferometer cavity comprises:
measuring an intensity of light from the first interferometer cavity and the reference interferometer cavity;
sampling the light intensity measurements, and
analyzing the samples of the light intensity measurements to determine the first interference amplitude of the first interferometer cavity and the second interference amplitude of the reference interferometer cavity.

6. The method of claim 5, comprising:
generating the light beam using a swept wavelength tunable laser;
sweeping the wavelength of the light beam from a first wavelength to a second wavelength; and
sampling the light intensity measurements synchronously with the sweeping operation of the swept wavelength tunable laser.

7. The method of claim 5 in which measuring the intensity of light reflected from the first interferometer cavity and the reference interferometer cavity comprises using a camera having a plurality of pixels to measure the intensity of light reflected from the first interferometer cavity and the reference interferometer cavity;
analyzing the samples of the light intensity measurements comprises analyzing the samples of the light intensity measurements for each pixel to determine the first interference amplitude of the first interferometer cavity and the second interference amplitude of the reference interferometer cavity for each pixel; and
determining the contact gap comprises determining the contact gap for each location of the contact interface that corresponds to each of the pixels.

8. The method of claim 1 in which information on the mapping between various interference amplitude ratios and expected contact gap values comprises information on a mapping between various interference amplitude ratios and expected contact gap values that are determined based on an interference model of the first interferometer cavity and the reference interferometer cavity.

9. The method of claim 1 in which the reference interferometer cavity is defined by a surface of a transmission flat of a source of the light beam and a first surface of an optical element, the first interferometer cavity is defined by a second surface of the optical element and a surface of a base nearest the second surface of the optical element, and the contact gap corresponds to a distance between the second surface of the optical element and the surface of the base.

10. The method of claim 9 in which the second surface of the optical element is bonded to the surface of the base by optical contact without using a glue between the second surface of the optical element and the surface of the base.

11. The method of claim 1 in which the first interference amplitude is affected by at least one of (i) one or more additional surfaces, or (ii) one or more additional cavities.

12. A method comprising:
generating a light beam using a swept wavelength tunable laser;
directing the light beam toward a first interferometer cavity and a reference interferometer cavity, in which the first interferometer cavity is defined by a first surface and a contact interface between a first optical element and a second optical element, the contact interface has a reflectivity that is dependent on a contact gap less than 1 µm, the contact gap representing a distance between a surface of the first optical element and a surface of the second optical element;
sweeping the wavelength of the light beam from a first wavelength to a second wavelength;
measuring an intensity of light reflected from the first interferometer cavity and the reference interferometer cavity, and sampling the light intensity measurements synchronously with the sweeping operation of the swept wavelength tunable laser;
performing spectral analysis of the sampled light intensity measurements to generate an optical thickness spectrum;
identifying a first peak and a second peak in the optical thickness spectrum; and
determining the contact gap based on a ratio of an amplitude of the first peak and an amplitude of the second peak.

13. The method of claim 12 in which the spectral analysis comprises Fourier-transform phase shifting interferometry analysis of interference intensity measured over a period of time.

14. The method of claim 12 in which the amplitude of the first peak is dependent on a reflectivity of the contact interface, and the amplitude of the second peak is dependent on characteristics of the reference interferometer cavity.

15. The method of claim 12 in which measuring the intensity of light reflected from the first interferometer cavity and the reference interferometer cavity comprises using a camera having a plurality of pixels to measure the intensity of light reflected from the first interferometer cavity and the reference interferometer cavity;
performing Fourier-transform phase shifting interferometry analysis of the sampled light intensity measurements comprises performing Fourier-transform phase shifting interferometry analysis of the sampled light intensity measurements for each pixel to generate an optical thickness spectrum for each pixel; and
determining the contact gap comprises determining the contact gap for each location of the contact interface that corresponds to each of the pixels.

16. The method of claim 12 in which determining the contact gap comprises:
determining the ratio of the amplitude of the first peak and the amplitude of the second peak; and
determining the contact gap based on information about a mapping between various amplitude ratios of first and second peaks and expected contact gap values determined based on an interference model of the first interferometer cavity and the reference interferometer cavity.

17. The method of claim 12 in which the reference interferometer cavity is defined by a surface of a transmission flat and a first surface of an optical element, the first interferometer cavity is defined by a second surface of the optical element and a surface of a base, and the contact gap corresponds to a distance between the second surface of the optical element and the surface of the base.

18. The method of claim 17 in which the second surface of the optical element is bonded to the surface of the base by optical contact without using a glue between the second surface of the optical element and the surface of the base.

19. The method of claim 12 in which the reference interferometer cavity is defined by a first surface of a parallel plate with known optical and physical characteristics and a second surface of the parallel plate, the first interferometer cavity is defined by the second surface of the parallel plate and a first surface of an optical element, and the contact gap corresponds to a distance between a second surface of the optical element and a surface of a base;
wherein at least a portion of the light beam passes the first and second surfaces of the parallel plate, passes the first surface of the optical element, and is reflected by an interface defined by the contact gap.

20. The method of claim 19 in which the second surface of the optical element is bonded to the surface of the base by optical contact without using a glue between the second surface of the optical element and the surface of the base.

21. The method of claim 12 in which the intensity of light is affected by at least one of (i) one or more additional surfaces, or (ii) one or more additional cavities.

22. An apparatus comprising:
a light source configured to generate a light beam that is configured to be directed to a first interferometer cavity and a reference interferometer cavity, in which the first interferometer cavity is defined by a first surface and a contact interface between a first optical element and a second optical element, the contact interface is defined by a contact gap less than 1 µm, the contact gap representing a distance between a surface of the first optical element and a surface of the second optical element;
a first storage storing instructions; and
a processor configured to execute the instructions to:
determine a first interference amplitude of the first interferometer cavity and a second interference amplitude of the reference interferometer cavity by applying wavelength tuning and spectral analysis to measured intensities of light from the first interferometer cavity and the reference interferometer cavity; and
determine the contact gap based on a ratio of the first interference amplitude and the second interference amplitude and information about a mapping between various interference amplitude ratios and expected contact gap values.

23. The apparatus of claim 22, comprising:
a second storage configured to store the information about the mapping between various interference amplitude ratios and expected contact gap values;
a detector module configured to measure intensities of light from the first interferometer cavity and the reference interferometer cavity; and an acquisition module configured to sample the light intensity measurements provided by the detector module, in which the samples of the light intensity measurements are analyzed by the processor to determine the contact gap.

24. The apparatus of claim 23 in which the detector module comprises a camera having a plurality of pixels; and the processor is configured to:
analyze the samples of the light intensity measurements for each pixel to determine the first interference amplitude of the first interferometer cavity and the second interference amplitude of the reference interferometer cavity for each pixel; and
determine the contact gap for each location of the contact interface that corresponds to each of the pixels.

25. The apparatus of claim 22 in which the light source comprises a swept wavelength tunable laser.

26. The apparatus of claim 22 in which the spectral analysis comprises Fourier-transform phase shifting interferometry analysis of interference intensity measured over a period of time.

27. The apparatus of claim 22 in which the contact gap is less than 100 nm.

28. The apparatus of claim 22 in which the contact gap is less than 10 nm.

29. An apparatus comprising:
a contact gap measurement device comprising:
a swept wavelength tunable laser that is configured to generate a light beam and sweep a wavelength of the light beam from a first wavelength to a second wavelength, in which the light beam is directed to a first interferometer cavity and a reference interferometer cavity, the first interferometer cavity is defined by a first surface and a contact interface between a first optical element and a second optical element, the contact interface is defined by a contact gap less than 1 μm, the contact gap representing a distance between a surface of the first optical element and a surface of the second optical element;
a detector module configured to measure intensities of light from the first interferometer cavity and the reference interferometer cavity;
an acquisition module configured to sample the light intensity measurements provided by the detector module;
a storage device storing instructions; and
a processor configured to execute the instructions to:
perform spectral analysis of the sampled light intensity measurements provided by the acquisition module to generate an optical thickness spectrum;
identify a first peak and a second peak in the optical thickness spectrum; and
determine the contact gap based on a ratio of an amplitude of the first peak and an amplitude of the second peak.

30. The apparatus of claim 29 in which the detector module comprises a camera having a plurality of pixels; and the processor is configured to:
for each pixel, perform spectral analysis of the sampled light intensity measurements provided by the camera to generate an optical thickness spectrum;
for each pixel, identify a first peak and a second peak in the optical thickness spectrum; and
determine the contact gap for each location of the contact interface that corresponds to each of the pixels based on a ratio of an amplitude of the first peak and an amplitude of the second peak associated with the pixel.

31. The apparatus of claim 29 in which the spectral analysis comprises Fourier-transform phase shifting interferometry analysis of interference intensity measured over a period of time.

32. The apparatus of claim 29 in which the contact gap is less than 100 nm.

33. The apparatus of claim 29 in which the contact gap is less than 10 nm.

34. A method comprising:
directing light towards a fourth surface and a third surface that is bonded to the fourth surface, wherein a bond gap representing a distance between the third surface and the fourth surface is less than 1 μm;
determining a value of a first parameter based on measurements of the light that interacted with the third and fourth surfaces, in which the first parameter is configured to depend on a value of the bond gap between the third and fourth surfaces; and
determining the value of the bond gap based on the value of the first parameter and information about a mapping between various values of the first parameter and expected bond gap values.

35. The method of claim 34 in which the first parameter represents a normalized amplitude of a spectral peak in a spectrogram generated by applying wavelength tuning and spectral analysis to measurements of the light reflected from the third surface, the fourth surface, and additional surfaces.

36. The method of claim 35 in which the additional surfaces comprise a first surface and a second surface,
the fourth surface comprises a front surface of a base,
the third surface comprises a rear surface of an optical part that is bonded to the base,
the second surface comprises a front surface of the optical part, the front surface being upstream to the rear surface in an optical path of the light,
the first surface comprises a reference surface,
the second and third surfaces define a test interferometer cavity, and
the first and second surfaces define a reference interferometer cavity.

37. The method of claim 36, comprising:
measuring a first interference intensity that includes information about an interference between portions of the light reflected from the second and third surfaces and an interference between portions of the light reflected from the first and second surfaces to generate a first set of measurements, and
generating the spectrogram by applying the spectral analysis to the first set of measurements.

38. The method of claim 36, comprising:
measuring a first interference intensity that includes information about an interference between portions of the light reflected from the second and third surfaces and an interference between portions of the light reflected from the first and second surfaces to generate a first set of measurements,
measuring a second interference intensity that includes information about an interference between portions of the light reflected from the second and third surfaces to generate a second set of measurements, in which the second interference intensity is not affected by an interference associated with the reference interferometer cavity, and
generating the spectrogram by applying the spectral analysis to the first set of measurements and the second set of measurements.

39. The method of claim 38, comprising tilting the first surface relative to an optical axis such that the light reflected from the first surface is not measured when generating the second set of measurements.

40. The method of claim 38, comprising:
directing light having a lower intensity towards the first, second, third, and fourth surfaces when measuring the first interference intensity,
directing light having a higher intensity towards the first, second, third, and fourth surfaces when measuring the second interference intensity, and
generating the spectrogram by applying the spectral analysis to the first set of measurements and the second set of measurements, in which the first set of measurements and the second set of measurements are scaled differently taking into account the difference between the lower intensity and higher intensity of the light when making the first and second sets of measurements.

41. The method of claim 35 in which the additional surfaces comprise a first surface and a second surface,
the fourth surface comprises a front surface of a base,
the third surface comprises a rear surface of an optical part that is bonded to the base,
wherein the optical part comprises a wedge such that a front surface of the optical part is not parallel to the rear surface of the optical part, and the front surface is upstream to the rear surface in an optical path of the light,
the second surface comprises a rear surface of a parallel plate,
the first surface comprises a front surface of the parallel plate,
the second and third surfaces define a test interferometer cavity, and
the first and second surfaces define a reference interferometer cavity.

42. The method of claim 41, comprising:
measuring a first interference intensity that includes information about an interference between portions of the light reflected from the second and third surfaces and an interference between portions of the light reflected from the first and second surfaces to generate a first set of measurements, and
generating the spectrogram by applying the spectral analysis to the first set of measurements.

43. The method of claim 35 in which the additional surfaces comprise a first surface and a second surface,
the fourth surface comprises a front surface of a base,
the third surface comprises a rear surface of an optical part that is bonded to the base,
wherein the optical part comprises a wedge such that a front surface of the optical part is not parallel to the rear surface of the optical part, and the front surface is upstream to the rear surface in an optical path of the light,
the second surface comprises a second optical reference surface,
the first surface comprises a first optical reference surface,
the first and third surfaces define a test interferometer cavity, and
the first and second surfaces define a reference interferometer cavity.

44. The method of claim 43, comprising:
measuring a first interference intensity that includes information about an interference between portions of the light reflected from the first and second surfaces to generate a first set of measurements;
measuring a second interference intensity that includes information about an interference between portions of the light reflected from the first and third surfaces to generate a second set of measurements, in which at least one of (i) the second interference intensity is not affected by an interference between portions of the light reflected from the first and second surfaces, or (ii) the second reference surface is removed when measuring the second interference intensity, and
generating the spectrogram by applying the spectral analysis to the first set of measurements and the second set of measurements.

45. The method of claim 44, comprising:
directing light having a lower intensity towards the first and second surfaces when measuring the first interference intensity,
directing light having a higher intensity towards the first, third, and fourth surfaces when measuring the second interference intensity, and
generating the spectrogram by applying the spectral analysis to the first set of measurements and the second set of measurements, in which the first set of measurements and the second set of measurements are scaled differently to take differences in intensity between the two sets of measurements into account.

* * * * *